(12) United States Patent
Kakuta

(10) Patent No.: US 6,456,900 B1
(45) Date of Patent: Sep. 24, 2002

(54) LOCKER TYPE MERCHANDISE DELIVERING SYSTEM

(75) Inventor: Kazumasa Kakuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/817,255

(22) Filed: Mar. 27, 2001

(30) Foreign Application Priority Data

Oct. 10, 2000 (JP) ........................................ 2000-309455

(51) Int. Cl.$^7$ ............................ G06F 17/00; G06F 7/04; G08B 13/14
(52) U.S. Cl. ........................ 700/233; 700/237; 700/241; 340/568.1; 340/825.35
(58) Field of Search ................................ 700/232, 233, 700/237, 241; 340/568.1, 825.35; 235/380, 381

(56) References Cited

U.S. PATENT DOCUMENTS

| | | | |
|---|---|---|---|
| 4,894,717 A | * | 1/1990 | Komei ..................... 348/14.01 |
| 5,126,732 A | * | 6/1992 | Mardon ..................... 340/5.33 |
| 5,223,829 A | * | 6/1993 | Watabe ....................... 700/215 |
| 5,774,053 A | * | 6/1998 | Porter ......................... 235/381 |
| 6,300,873 B1 | * | 10/2001 | Kucharczyk et al. .... 340/568.1 |
| 6,323,782 B1 | * | 11/2001 | Stephens et al. ......... 340/10.31 |
| 6,344,796 B1 | * | 2/2002 | Ogilvie et al. ........... 340/568.1 |

FOREIGN PATENT DOCUMENTS

| | | |
|---|---|---|
| JP | 64-49505 | 2/1989 |
| JP | 7-11806 | 2/1995 |
| JP | 9-282531 | 10/1997 |

* cited by examiner

Primary Examiner—Christopher P. Ellis
Assistant Examiner—Gene O. Crawford
(74) Attorney, Agent, or Firm—Staas & Halsey LLP

(57) ABSTRACT

A locker type delivering system according to this invention includes a plurality of merchandise delivering equipment installed at public sites, accepts designation of a place and a time by a customer when the customer orders the merchandise, manages ordering information about the order of the merchandise inclusive of the designation on the basis of an ordering code, and sends the ordering code to the customer. Settling means provided to merchandise delivering equipment acquires ordering information corresponding to the input of the ordering code, and controls the unlocking the door of the corresponding locker by generating a suitable release code when an appropriate amount of money based on this ordering information is received. Therefore, this system can safely accomplish settlement of the charge and delivery of the merchandise to unspecified customers while protecting privacy of the customers.

12 Claims, 14 Drawing Sheets

LOCKER TYPE MERCHANDISE DELIVERING SYSTEM

BACKGROUND OF THE INVENTION

1. Field of the Invention

This invention relates to a locker type merchandise delivering system for reliably delivering merchandise ordered by a customer to the customer by utilizing a non-store retailing site such as electronic shopping.

As personal computers and hand-held terminals have become wide spread, demands have been increasing drastically for non-store retailing services by directly exchanging information between customers and sellers through the Internet, or the like.

The non-store retailing services require a delivering method that replaces a method that directly hands the merchandise to the customer in the shop in addition to a settling method that replaces a conventional settling method by which the seller receives the charge from the customer in the shop.

2. Description of the Related Art

In the conventional non-store retailing service, the customer connects a personal computer to the Internet, gains access to the home page of a seller, exchanges necessary information and orders merchandise.

Receiving the order of the merchandise, the seller requests a delivering company to package and to deliver the merchandise to the customer's house. Also, the delivering company can deliver the merchandise to a convenience store designated by the customer, and the customer can come to the convenience store and pick up the merchandise. Convenience of the customer is thus insured as the merchandise is delivered to the customer's house or to the convenience store nearby.

To settle the charge of the merchandise delivered to the customer, the delivering company or the convenience store collects the charge on the cash-on-delivery basis, by making a withdrawal through a credit card, transferring to postal or bank account.

For example, when the merchandise is delivered to the customer's house, the customer needs to be at home in order to have the merchandise delivered. And when postal transfer is used to settle the charge, the customer has to go to the post office or to the bank to transfer the money. Great limitation of time is imposed on the customer by using conventional ways. Also, in order to deliver the merchandise to the customer's house, the delivering company has to know personal information of the customer such as the address and the telephone number. Since such personal information is handed over from the seller to the delivering company, personal information cannot always be protected sufficiently.

When delivery of the merchandise and settlement of the charge are made in the convenience store, the limitation of the time can be eliminated on the contrary to the case described above. However, there is the possibility that privacy of the customer cannot be protected sufficiently.

On the other hand, when the settling method utilizing the credit card is employed, the limitation of time imposed on the customer becomes small because the customer need not go to the bank. However, since the credit card number is transmitted through the network, a great problem exists in the aspect of security. In addition, the problem of delivery of the merchandise yet remains unsolved in the same way as in the two methods described above.

A service that uses a door-to-door delivery box comprising a plurality of home delivery lockers and installed as receive-only boxes in an apartment house has been materialized as a technology for solving a part of the problem of delivery of the merchandise (Japanese Patent Publication No. 2,834,754 and Japanese Patent Laid-Open Publication Nos. 64-49505 and 9-282531).

This technology gives importance to reliable stipulation of the person who receives the merchandise. The party to which the merchandise is delivered is limited to only the person who is in advance registered to a sales management center, such as a resident in an apartment house having the home delivery lockers.

Similarly, Japanese Patent Publication No. 7-11806 discloses a technology for delivering the merchandise by utilizing delivery lockers. According to this technology, when a proper customer utilizing the non-store retailing service through the network conducts a suitable operation for an article delivering equipment installed in a place where people gather and verifies his identification for receiving the merchandise, the customer can receive the merchandise.

This technology can mitigate much more greatly the limitation imposed on the customer than the home delivery lockers installed in the apartment houses because the article delivering equipment is installed at the place where the customers gather. However, verification of identification for receiving the merchandise is based on the premise that the customer can clearly verify identity of himself. Therefore, to receive the non-store retailing service applying this technology, the customer must register in advance the personal identification number, etc, in the same way as in the above service using the home delivery lockers.

SUMMARY OF THE INVENTION

It is an object of the invention to provide a locker type merchandise delivering system capable of safely settling the charge of merchandise and delivering merchandise for indefinite customers while protecting privacy of the customers.

It is another object of the invention to make it possible to receive orders of merchandise to meet with demands from indefinite customers and set a delivery site, and to settle the charge and deliver the merchandise, without relying at all on manual work, to improve convenience of the customers and to firmly protect privacy of the customers.

It is a further object of the invention to accomplish a service that relieves customers from limitation of time and place imposed on the customer to deliver the merchandise and to settle the charge of the merchandise.

The objects described above can be accomplished by a locker type merchandise delivering system including a plurality of merchandise delivering equipment each being constituted by integrating together a plurality of lockers capable of being locked, a settling unit for settling charge of a merchandise, and a door controlling unit for controlling opening and closing of a door provided to each of the lockers, and said plurality of merchandise delivery equipment installed at public sites such as a train station where unspecified persons can freely enter and leave, the system comprising: an order receiving unit for receiving designation of a place and time at an which a customer desires to receive the merchandise, when ordering the merchandise; an order entry controlling unit for generating an ordering code for specifying the order of the merchandise, and for managing the ordering information relating to the designated place and time on the basis of the ordering code; an sending unit for sending the ordering code to the customer, wherein the settling unit includes: an ordering code inputting unit for accepting the entry of the ordering code; an ordering information inputting unit for receiving, from the order entry controlling unit, ordering information corresponding to the ordering code inputted; an accepting unit for accepting the charge of the merchandise on the basis of the ordering information; and a code notifying unit for notifying to the door controlling unit a release code for unlocking the door of an appropriate locker in response to the acceptance of the charge, and wherein the door controlling unit includes: a code receiving unit for generating a release instruction in response to the reception of the release code, by designating a corresponding locker; and a release unit for releasing the lock built into the door of the corresponding locker in accordance with the release instruction.

Such a locker type merchandise delivering system can accept the order of merchandise in accordance with the request from an unspecified customer, can set the delivery place, and can settle the charge of the merchandise and deliver the merchandise without relying at all on the manual work.

The objects described above can be accomplished also by a locker type merchandise delivering system including a plurality of merchandise delivering equipment each being constituted by integrating together and arranging adjacent to one another a plurality of lockers capable of being locked, a settling unit for settling charge of a merchandise, and a door controlling unit for controlling opening and closing of a door provided to each of the lockers, and installed at public sites such as a train station where unspecified persons can freely enter and leave, the system comprising order receiving unit for receiving designation of a place and time at which a customer desires to receive the merchandise, when ordering the merchandise; an order entry controlling unit for managing ordering information relating to the merchandise and its delivering place on the basis of an ordering code generated in accordance with ordering of the merchandise, and a sending unit for sending the ordering code to the customer; wherein the settling unit includes the ordering code inputting unit for accepting the entry of the ordering code; an ordering information inputting unit for receiving ordering information corresponding to the inputted ordering code from the order entry controlling unit; an accepting unit for accepting the charge of the merchandise on the basis of the ordering information; a code outputting unit for outputting a predetermined recording medium recording settling information inclusive of the combination of a release code for unlocking the door of an appropriate locker with the ordering code in response to the acceptance of the charge; and a code notifying unit for notifying the release code corresponding to the ordering code to the door controlling unit; and wherein the door controlling unit includes a reading unit for reading the settling information recorded to the recording medium; a code receiving unit for receiving the release code corresponding to the ordering code; a comparing unit for comparing the release code received by the code receiving unit with the release code contained in the settling information, and generating a release instruction when they coincide with each other, by designating a corresponding locker; and a release unit for releasing the lock built in to the door of the corresponding locker in accordance with the release instruction.

Such a locker type merchandise delivering system can accept the order of the merchandise in accordance with the request from an unspecified customer, and can settle the charge of the merchandise and deliver the merchandise without relying at all on one's hand. Furthermore, this locker type merchandise delivering system can reliably deliver the merchandise accommodated in the locker to the customer who appropriately settles the charge irrespective of the distance between the settling unit and the locker. It is therefore possible, for example, to space apart the settling unit and the lockers or to manage a large number of lockers by one settling unit.

The objects described above can be accomplished also by the locker type merchandise delivering system described above wherein the sending unit includes an uplinking unit for notifying the ordering code to the destination represented by identification information for specifying a customer ordering the merchandise, and an acquiring unit for acquiring a response to the notification and notifying the response to an order entry controlling unit.

This locker type merchandise delivering system confirms the identification information the customer inputs at the time of ordering, and can use this information when the order entry controlling unit controls the ordering information. Therefore, this system can suppress the loss resulting from an invalid order not supported by the identification information.

The objects described above can be further accomplished by the locker type merchandise delivering system described above wherein the door controlling unit includes a merchandise information storing unit for storing merchandise information for specifying a merchandise to be accommodated in the locker and the ordering code so that they correspond to each locker; a merchandise information inputting unit for receiving the ordering code and the merchandise information prior to the accommodation of the merchandise into the locker; and a retrieving unit for retrieving ordering code and merchandise information coincident with the inputted ordering code and with the merchandise information, from the merchandise information storing unit, and for inputting a release instruction instructing the release unit to release the lock, by designating the corresponding locker.

The locker type merchandise delivering system described above can accommodate merchandise that is coincident with the merchandise information designated by the ordering code when the distributing party accommodates the merchandise into the locker, and can therefore prevent delivery mistakes.

The objects described above can be further accomplished by the locker type merchandise delivering system described above wherein the door controlling unit comprises: a code acquiring unit for acquiring the ordering code corresponding to the merchandise when the merchandise is accommodated in the locker; a distribution detecting unit for detecting completion of distribution of the merchandise into the locker; and a distribution notifying unit for notifying a message representing completion of distribution of the merchandise corresponding to the ordering code to the order entry controlling unit when the distribution detecting unit detects completion of distribution of the merchandise.

Since the locker type merchandise delivering system can notify the distribution completion message for the corresponding ordering code to the order entry controlling unit, this system can accomplish services utilizing the information on the distribution of merchandise, such as a service that notifies completion of the distribution of the merchandise to the customer.

The objects described above can be further accomplished by the locker type merchandise delivering system described above wherein the door controlling unit 120 comprises: a delivery detecting unit for detecting completion of delivery of the merchandise; and a delivery notifying unit for sending a message representing completion of delivery of the merchandise corresponding to the ordering code to the order entry controlling unit when the delivery detecting unit detects completion of delivery of the merchandise.

The locker type merchandise delivering system described above detects completion of the delivery of the merchandise and notifies completion to the order entry controlling unit. Therefore, this system can accomplish services utilizing the information relating to the delivery of the merchandise.

The objects described above can be accomplished by the locker type merchandise delivering system described above wherein the code outputting unit comprises: a code generating unit for generating a release code in response to completion of acceptance of the charge by the accepting unit and putting the release code under a notifying process by the code notifying unit; and a recording unit for recording the release code on a predetermined recording medium.

The locker type merchandise delivering system can greatly lower the danger of the leakage of the release code before the customer picks up the merchandise, and can therefore improve reliability of the system.

The objects described above can be further accomplished by the locker type merchandise delivering system described above wherein the ordering code inputting unit comprises: a data inputting unit provided to automatic ticket-vending machine, for inputting a predetermined instruction code and the ordering code together with data necessary for purchasing a ticket; and a data entering unit for receiving the predetermined instruction code and the ordering code inputted by the data inputting unit; wherein the accepting unit includes a money accepting unit provided to automatic ticket-vending machine, for accepting and recovering the money put in by the customer; and a money receiving unit for receiving the money received by the money accepting unit as the charge of the merchandise corresponding to the ordering code, in response to acceptance of the ordering code by the data entering unit, and wherein the code outputting unit includes a ticket-issuing unit provided to automatic ticket-vending machine, for recording the inputted information to a recording medium as a material of a ticket and then discharging the recording medium; and a record controlling unit for inputting settling information inclusive of a release code as information to be recorded to the recording medium to the ticket-issuing unit in response to receipt of the charge by the money receiving unit.

The locker type merchandise delivering system described above can accomplish several functions of the settling unit by utilizing the corresponding functions of the automatic ticket-vending machine. Therefore, this locker type merchandise delivering system can suppress the increase of the cost due to expansion of services by the system, and can promote the wide-spreading of the locker type merchandise delivering system.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

[Principle]

First, the principle of a locker type merchandise delivering system according to the invention will be explained.

Figure 1:
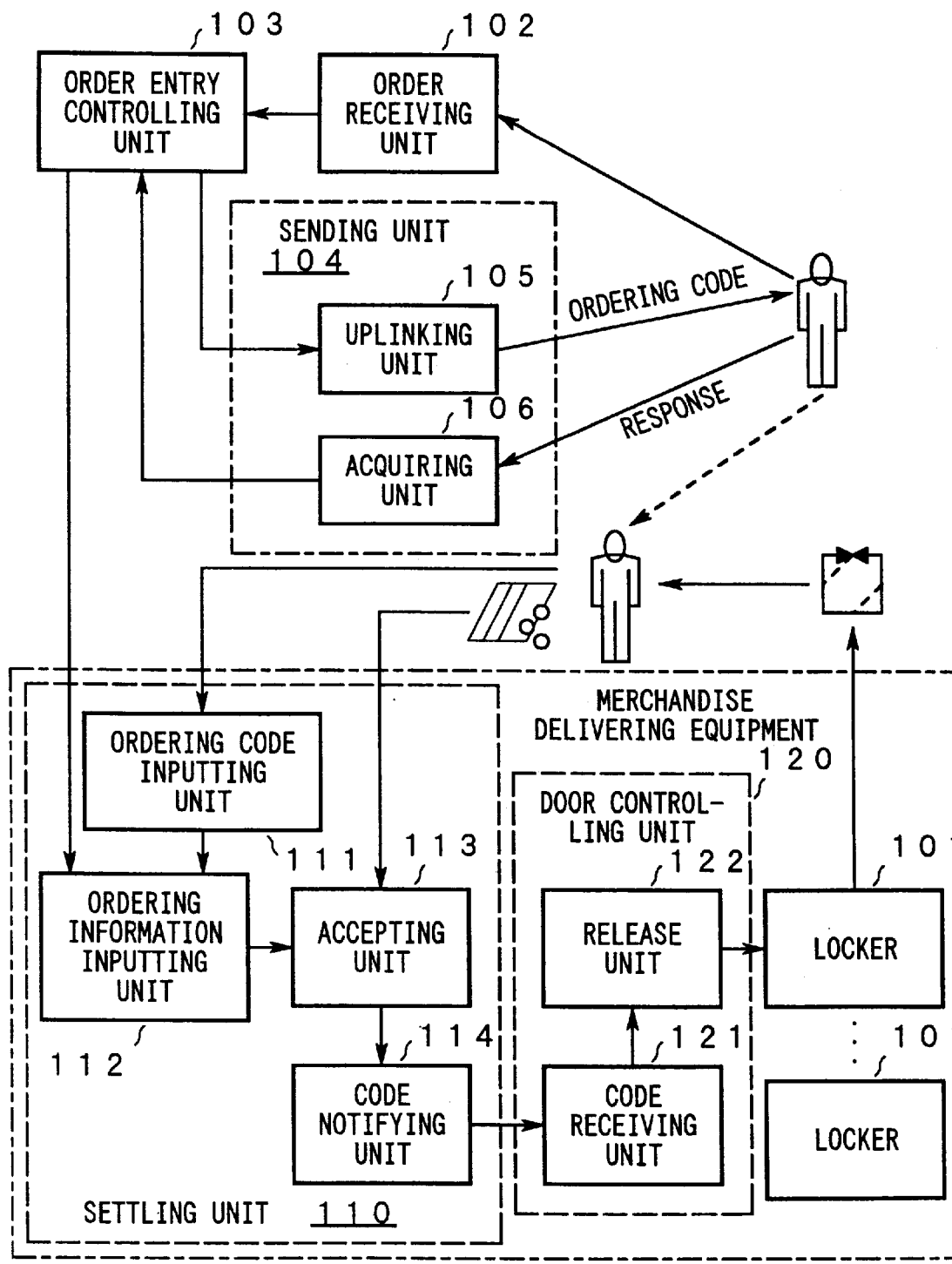
FIG. 1 shows first and third principles of locker type merchandise delivering systems according to the present invention.

FIG. 1 shows first and third principles of the locker type merchandise delivering system according to the invention.

The locker type merchandise delivering system shown in FIG. 1 includes a plurality of merchandise delivering equipment, an order receiving unit 102, an order entry controlling unit 103 and a sending unit 104. Each merchandise delivering equipment includes lockers 101, a settling unit 110 and a door controlling unit 120 each unit being arranged unitarily with one another. The settling unit 110 includes an ordering code inputting unit 111, an ordering information inputting unit 112, an accepting unit 113 and a code notifying unit 114. The door controlling unit 120 includes a code receiving unit 121 and a release unit 122.

The first principle of the locker type merchandise delivering system according to the invention is as follows.

Each of a plurality of merchandise delivering equipment includes a plurality of lockers 101 each capable of being locked, the settling unit 110 for settling the charge of the merchandise, and the door controlling unit 120 for controlling opening/closing of the door provided to each locker 101 that are arranged unitarily with one another. These merchandise delivering equipment are installed at places that are open to free access by unspecified persons. The order receiving unit 102 accepts the place and the time at which a customer desires to receive the merchandise. Order entry controlling unit 103 generates an ordering code for specifying an order of a merchandise and manages data relating to the designated place and time and ordering information inclusive of the price of the merchandise so that they correspond to the ordering code. Sending unit 104 sends the ordering code generated by the order entry controlling unit 103 to the customer. The ordering code inputting unit 111 in the settling unit 110 accepts the input of the ordering code.

Ordering information inputting unit 112 in the settling unit 110 accepts the ordering information corresponding to the ordering code inputted by the ordering code inputting unit 111 from the order entry controlling unit 103 prior to settlement of the charge of the merchandise. Accepting unit 113 in the settling unit 110 accepts the charge of the corresponding merchandise on the basis of the ordering information. Code notifying unit in the settling unit 110 notifies a release code for unlocking the door of the locker 101 storing the merchandise to the door controlling unit 120 in accordance with the acceptance of the charge. Code receiving unit 121 in the door controlling unit 120 receives the release code from the settling unit 110, designates the corresponding locker 101 and generates a release instruction that instructs the release of the lock. Release unit in the door controlling unit 120 releases the lock built in to the door of the corresponding locker in accordance with this release instruction.

The locker type merchandise delivering system having the construction described above operates in the following way.

The order entry controlling unit 103 generates the ordering code in response to the order from the customer, manages the information on the merchandise and on the delivering place on the basis of this ordering code, and sends this ordering code to the customer through the sending unit 104. Since this ordering code is used as the key information for settling the charge of the merchandise and for delivering the merchandise, the process steps from ordering of the merchandise till its delivery can be managed through only this ordering code. The ordering information inputting unit 112 acquires the corresponding ordering information from the order entry controlling unit 103 on the basis of the ordering code inputted by the ordering code inputting unit 111 and offers this ordering information so that the accepting unit 113 can execute the charge accepting process to reliably collect an appropriate sum of the charge as the charge of the merchandise from the customer. The code notifying unit 114 notifies the release code to the door controlling unit 120 in response to the acceptance of the charge. Receiving the release code, the release unit 122 of the door controlling unit 120 unlocks the door of the corresponding locker 101. In consequence, the customer who settles properly the charge of the merchandise can reliably receive the merchandise stored in the locker 101.

Figure 2:
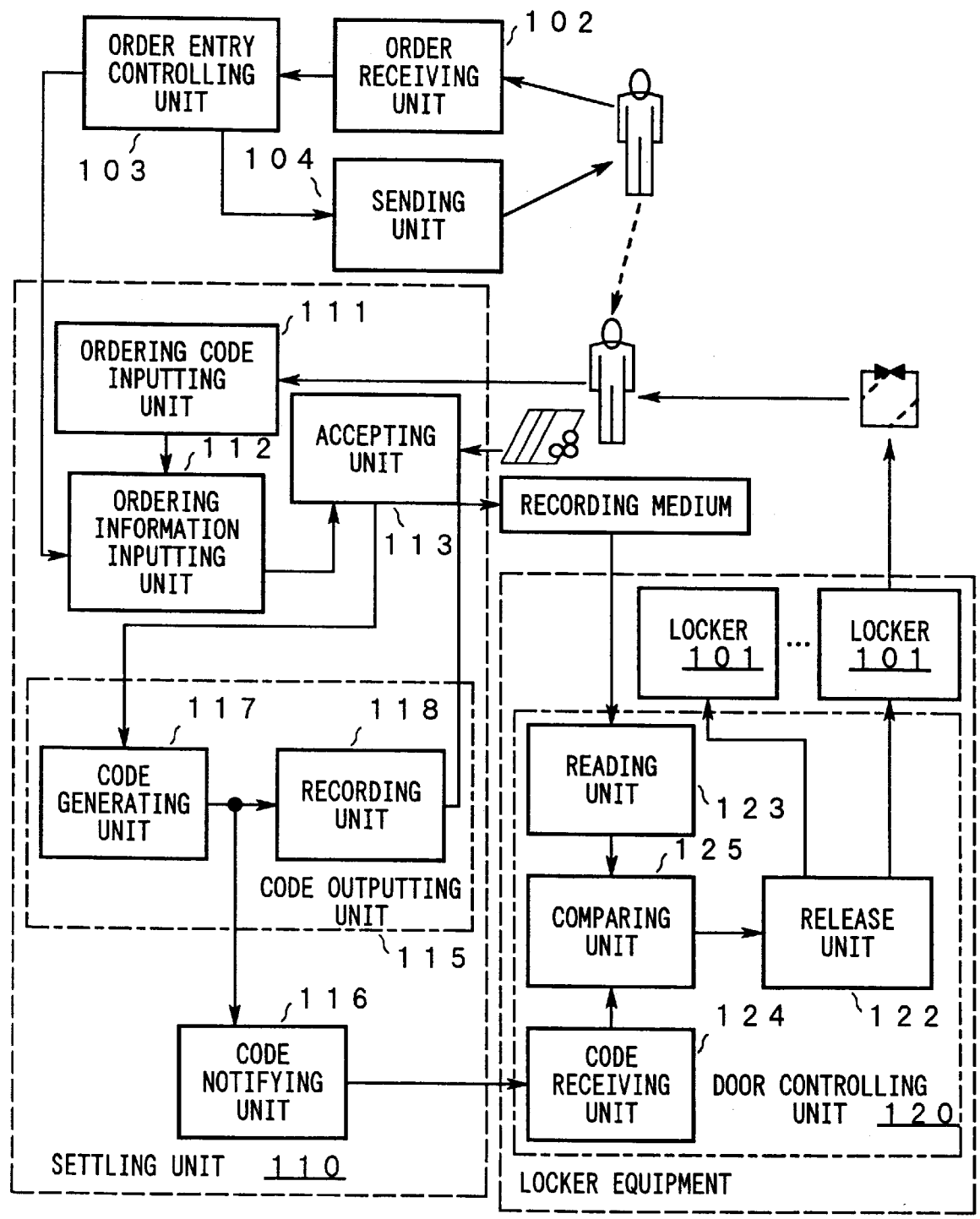
FIG. 2 shows second and seventh principles of locker type merchandise delivering systems according to the present invention.

FIG. 2 shows the second and seventh principles of the locker type merchandise delivering system according to the invention.

The locker type merchandise delivering system shown in FIG. 2 includes a plurality of merchandise delivering equipment each including lockers 101, a settling unit 110 and a door controlling unit 120 disposed nearby one another, an order receiving unit 102, an order entry controlling unit 103 and a sending unit 104. The settling unit 110 includes an ordering code inputting unit 111, an ordering information inputting unit 112, an accepting unit 113, a code outputting unit 115 and a code notifying unit 116. Door controlling unit 120 includes a reading unit 123, a code receiving unit 124, a comparing unit 125 and a release unit 122.

The second principle of the locker type merchandise delivering system according to the invention is as follows.

Each merchandise delivering equipment includes a plurality of lockers 101 capable of being locked, a settling unit 110 for settling the charge of a merchandise and a door controlling unit 120 for controlling opening/closing a door provided to each locker 101 that are arranged nearby each other. The merchandise delivering equipment is installed at a place that is open to free access of unspecified persons. Order receiving unit 102 accepts designation of the place and the time where a customer desires to receive the merchandise. Order entry controlling unit 103 generates an ordering code for specifying the order of a merchandise, and manages data relating to the designated place and time and ordering information, inclusive of the price of the merchandise, so that they correspond to the ordering code. Sending unit sends the ordering code generated by the order entry controlling unit 103 to the customer. Ordering code inputting unit 111 in the settling unit 110 accepts the input of the ordering code. Ordering information inputting unit 112 in the settling unit 110 receives ordering information corresponding to the ordering code inputted by the ordering code inputting unit 111, from the order entry controlling unit 103. Accepting unit 113 in the settling unit 110 accepts the charge of the corresponding merchandise on the basis of the ordering information. Code outputting unit 115 in the settling unit 110 outputs a recording medium, that is recorded settling information including a combination of a release code for unlocking the door of the locker accommodating the merchandise and the ordering code, in accordance with the acceptance of the charge. Code notifying unit 116 in the settling unit 110 notifies the release code corresponding to the ordering code to the door controlling unit 120. Reading unit 123 in the door controlling unit 120 reads settling information recorded to the recording medium. Code receiving unit 124 in the door controlling unit 120 receives the release code corresponding to the ordering code from the settling unit 110. Comparing unit 125 in the door controlling unit 120 compares the release code, that the code receiving unit 124 receives in response to the ordering code contained in the settling information, with the release code contained in the settling information, and when the codes coincide with each other, designates the corresponding locker and issues a release instruction that instructs the release of the lock. Release unit 122 in the door controlling unit 120 releases the lock built in to the door of the corresponding locker in accordance with the release instruction.

The locker type merchandise delivering system having the construction described above operates in the following way.

The order entry controlling unit 103 generates the ordering code in accordance with an order from a customer and manages information on the merchandise and on the place of delivery on the basis of this ordering code. The sending unit 104 sends this ordering code to the customer. Since the ordering code is used as key information on settlement of the charge of the merchandise and its delivery, the process steps from the order of the merchandise till its delivery can be managed by only the ordering code. The ordering information inputting unit 112 acquires the corresponding ordering information from the order entry controlling unit 103 on the basis of the ordering code inputted by the ordering code inputting unit 111 and puts the ordering information to use with the accepting unit 113 in the charge accepting processing so that an appropriate amount can be reliably collected as the charge from the customer. The code notifying unit 116 notifies the release code to the door controlling unit 120 in accordance with the acceptance of the charge, and the code outputting unit 115 records the release code onto the recording medium and outputs it. The reading unit 123 provided to the door controlling unit 120 reads the release code recorded to the recording medium. The comparing unit 125 compares this release code with the release code which is notified by the notifying unit, and which the code receiving unit 124 receives. When these release codes coincide with each other, the release unit 122 unlocks the door of the corresponding locker 101 in accordance with the release instruction generated by the comparing unit 125.

Hereinafter, the third principle of the invention will be explained with reference to FIG. 1.

In the locker type merchandise delivering system shown in FIG. 1 and constituted in accordance with the first or second principle of the invention, the sending unit includes uplinking unit 105 and acquiring unit 106.

The third principle of the locker type merchandise delivering system according to the invention is as follows.

The uplinking unit 105 in the sending unit 104 sends the ordering code to the address represented by identification information, for specifying the customer who orders the merchandise. Acquiring unit 106 in the sending unit 104 acquires the response from the address and notifies the response to the order entry controlling unit.

The locker type merchandise delivering system having the construction described above operates in the following way.

An example of the identification information for identifying the customer at the time of ordering is a mail address. In case that a mail address is registered by the customer as identification information at the time of ordering, the uplinking unit 105 provided to the sending unit 104 sends the ordering code by electronic mail addressed to this mail address, and the acquiring unit 106 acquires the response to this electronic mail.

Figure 3:
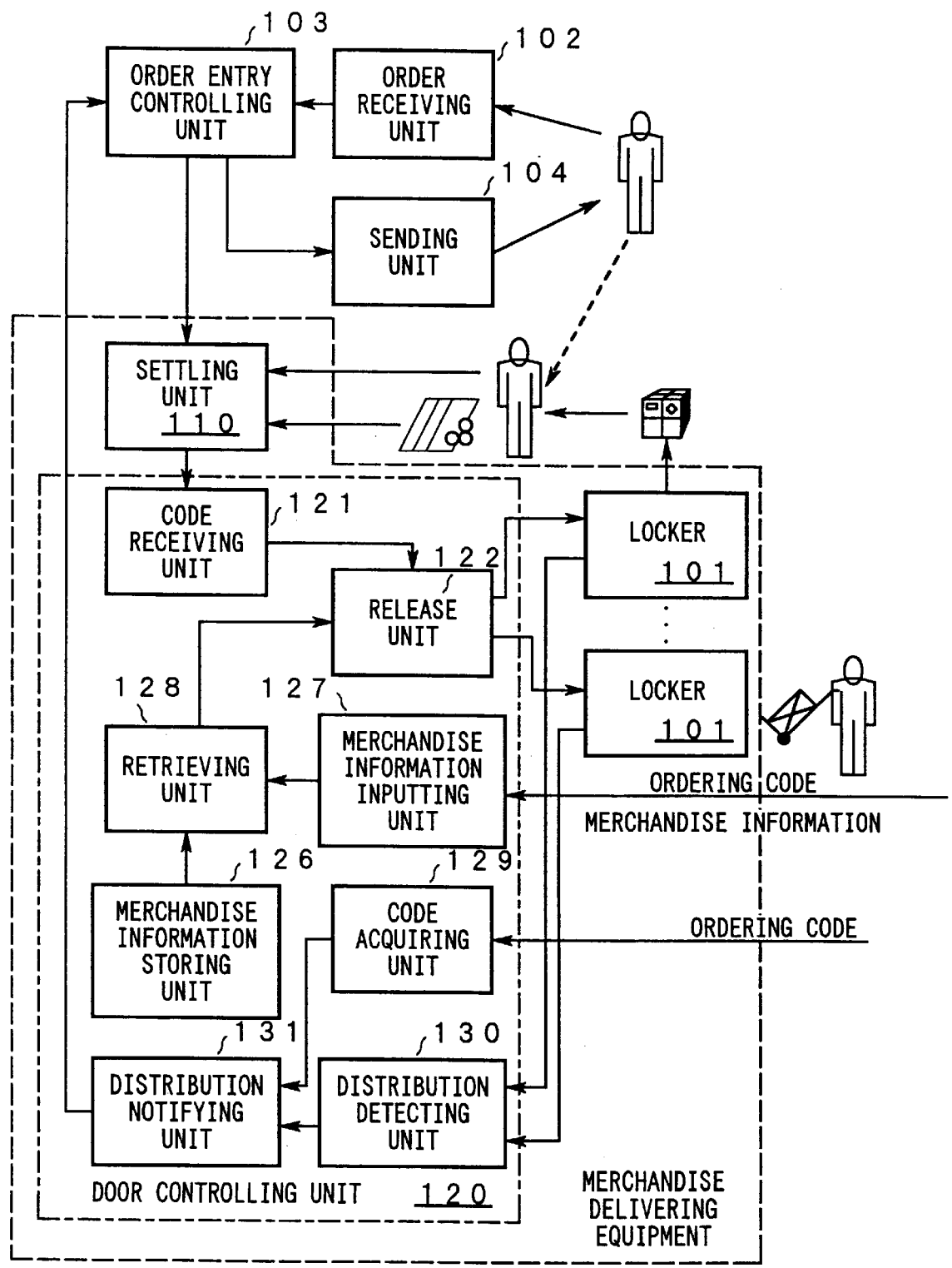
FIG. 3 shows fourth and fifth principles of locker type merchandise delivering system according to the present invention.

FIG. 3 shows the fourth and fifth principles of the locker type merchandise delivering system according to the present invention.

In the locker type merchandise delivering system constituted in accordance with the first or second principle, the locker type merchandise delivering system shown in FIG. 3 having the door controlling unit 120 includes merchandise information storing unit 126, merchandise information inputting unit 127 and retrieving unit 128.

The fourth principle of the locker type merchandise delivering system according to the invention is as follows.

The merchandise information storing unit 126 in the door controlling unit 120 stores merchandise information for specifying a merchandise to be accommodated in the locker and the corresponding ordering code in such a fashion as to correspond to each locker. The merchandise information inputting unit 127 in the door controlling unit 120 receives the ordering code and the corresponding merchandise information prior to accommodation of the merchandise into the locker. The retrieving unit 128 in the door controlling unit 120 retrieves a record coincident with a combination of the inputted ordering code and the merchandise information, from the merchandise information storing unit 126, designates the corresponding locker and inputs the release instruction that instructs the release of the lock to the release unit 122.

The locker type merchandise delivering system having the construction described above operates in the following way.

When accommodating a merchandise into the locker 101, the merchandise information inputting unit 127 receives the merchandise information for specifying the merchandise to be accommodated and the ordering code through an input process by a distributing party, and the retrieving unit 128 retrieves the locker 101 corresponding to a combination of the merchandise information held by the merchandise information storing unit 126 and the ordering code. Consequently, the unlocking of the corresponding locker 101 can be instructed to the release unit 122.

Next, the fifth principle according to the invention will be explained with reference to FIG. 3.

In the locker type merchandise delivering system constituted in accordance with the first or second principle, the locker type merchandise delivering system has a door controlling unit including a code acquiring unit 129, a distribution detecting unit 130 and a distribution notifying unit 131.

The fifth principle of the locker type merchandise delivering system according to the invention is as follows.

The code acquiring unit 129 in the door controlling unit 120 acquires the ordering code corresponding to the merchandise when the merchandise is accommodated into the locker. The distribution detecting unit 130 in the door controlling unit 120 detects completion of the distribution of the merchandise when the merchandise is accommodated into the locker and the door of the locker is closed. When the distribution detecting unit 130 detects completion of the distribution of the merchandise, the distribution notifying unit 131 in the door controlling unit 120 sends a message representing completion of the distribution of the merchandise corresponding to the ordering code to the order entry controlling unit 103.

The locker type merchandise delivering system having the construction described above operates in the following way.

The distribution notifying unit 131 notifies a distribution completion message on the ordering code acquired by the code acquiring unit 129 to the order entry controlling unit 103 in response to the detection result by the distribution detecting unit 130.

Figure 4:
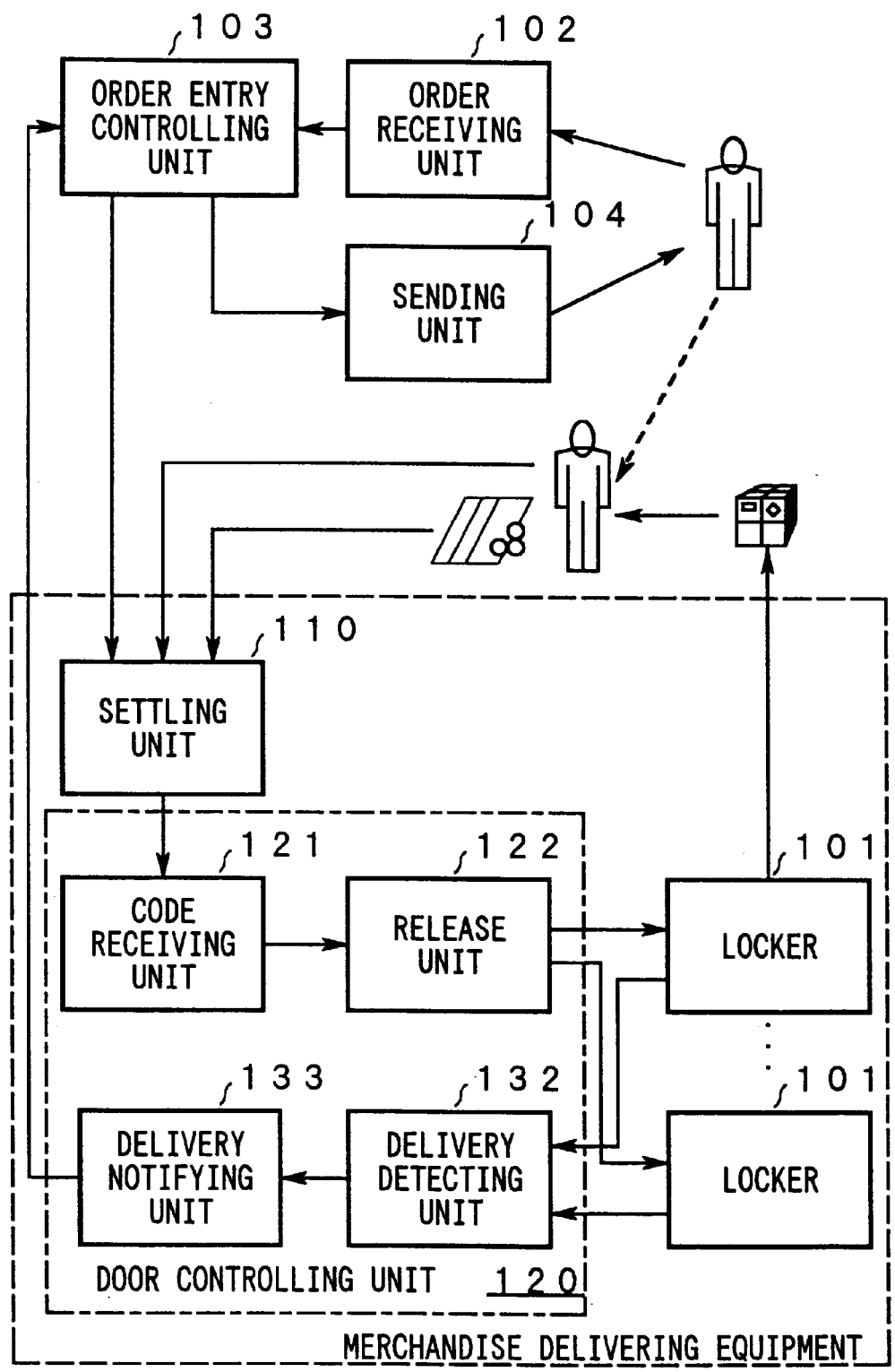
FIG. 4 shows sixth principle of a locker type merchandise delivering system according to the present invention.

FIG. 4 shows the sixth principle of the locker type merchandise delivering system according to the present invention.

In the locker type merchandise delivering system constituted in accordance with the first or second principle, the locker type merchandise delivering system shown in FIG. 4 has a door controlling unit 120 including a delivery detecting unit 132 and a delivery notifying unit 133.

The sixth principle of the locker type merchandise delivering system according to the invention is as follows.

The delivery detecting unit 132 in the door controlling unit 120 detects completion of the delivery of the merchandise through the locker when the merchandise accommodated in the locker with its door open is taken out and the door of this locker is again closed. When the delivery detecting unit 132 detects completion of the delivery of the merchandise, the delivery notifying unit 133 in the door controlling unit 120 notifies the message representing completion of the delivery of the merchandise corresponding to the ordering code to the order entry controlling unit 103.

The locker type merchandise delivering system having the construction described above operates in the following way.

The delivery notifying unit 133 notifies the message representing completion of the delivery of the merchandise to the order entry controlling unit 103 in accordance with the detection result by the delivery detecting unit 132.

Next, the seventh principle of the invention will be explained with reference to FIG. 2.

In the locker type merchandise delivering system constituted in accordance with the second principle, the locker type merchandise delivering system shown in FIG. 2 has a code outputting unit 115 comprising a code generating unit 117 and a recording unit 118.

The seventh principle of the locker type merchandise delivering system according to the invention is as follows.

The code generating unit 117 in the code outputting unit 115 generates the release code in accordance with completion of acceptance of the charge by the accepting unit 113 and puts it under the notification processing by the code notifying unit 116. The recording unit 118 in the code outputting unit 115 records the release code generated by the code generating unit 117 on the recording medium.

The locker type merchandise delivering system having the construction described above operates in the following way.

The code generating unit 117 provided to the code outputting unit 115 generates the release code only after acceptance of the charge is completed, and the recording unit 118 records the release code to the recording medium.

Figure 5:
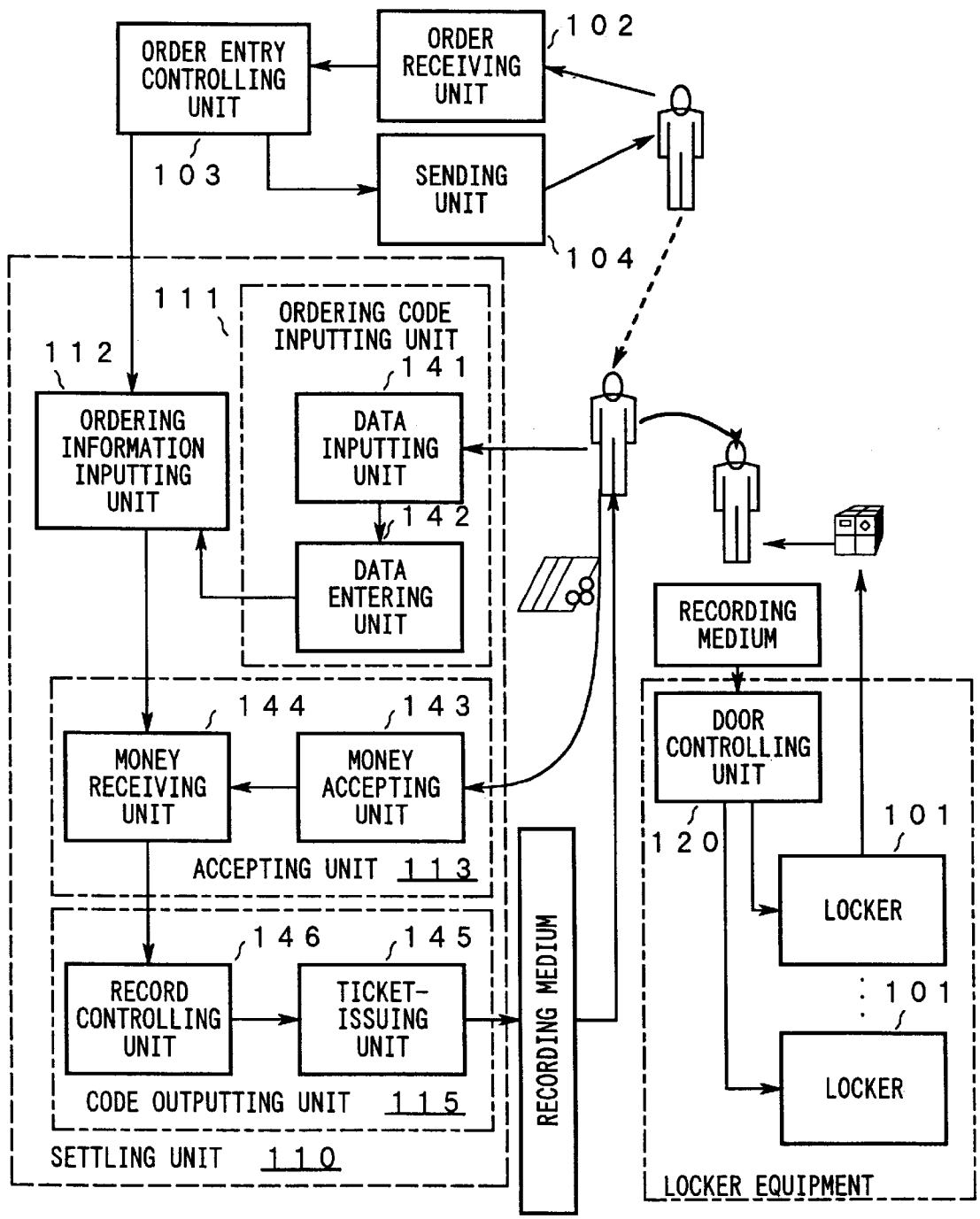
FIG. 5 shows eighth principle of a locker type merchandise delivering system according to the present invention.

FIG. 5 shows the eighth principle of the locker type merchandise delivering system according to the present invention.

In the locker type merchandise delivering system constituted according to the second principle, the locker type merchandise delivering system shown in FIG. 5 has a ordering code inputting unit 111 comprising a data inputting unit 141 and a data entering unit 142, an accepting unit 113 comprising a money accepting unit 143 and a money receiving unit 144, and a code outputting unit 115 comprising a ticket-issuing unit 145 and a record controlling unit 146.

The eighth principle of the locker type merchandise delivering system according to the invention is as follows.

In the ordering code inputting unit 111, the data inputting unit 141 is provided to an automatic ticket-vending machine, and inputs a predetermined instruction code and the ordering code together with data necessary for purchasing a ticket. The data entering unit 142 in the ordering code inputting unit 115 receives the predetermined instruction code and the ordering code both being inputted by the data inputting unit. The money accepting unit 143 in the accepting unit 113 is provided to the automatic ticket-vending machine and accepts and receives the money put in by the customer. The money receiving unit 144 in the accepting unit 113 takes the money received by the money accepting unit 143 as the charge of the merchandise corresponding to the ordering code. The ticket-issuing unit 145 in the code outputting unit 115 is provided to the automatic ticket-vending machine, records the inputted information on the recording medium as a material of the ticket and discharges the recording medium. The record controlling unit 146 in the code outputting unit 115 inputs to the ticket-issuing unit 145 the settling information inclusive of the release code as the information to be recorded on the recording medium in accordance with the acceptance of the charge by the money receiving unit 144.

The locker type merchandise delivering system having the construction described above operates in the following way.

The data entering unit 142 accepts the predetermined instruction code and the ordering code from the data inputted by the data inputting unit 141. The money receiving unit 144 receives the money received by the money accepting unit 143 as the charge of the merchandise in response to this instruction code and the ordering code. The record controlling unit 146 inputs a settling information relating to the receipt of the charge to the ticket-issuing unit 145. In this way, the ticket issuing unit 145 records the settling information to a recording medium and outputs the recording medium.

[Embodiment]

Hereinafter, embodiments of the invention will be explained in detail with reference to the accompanying drawings.

Figure 6:
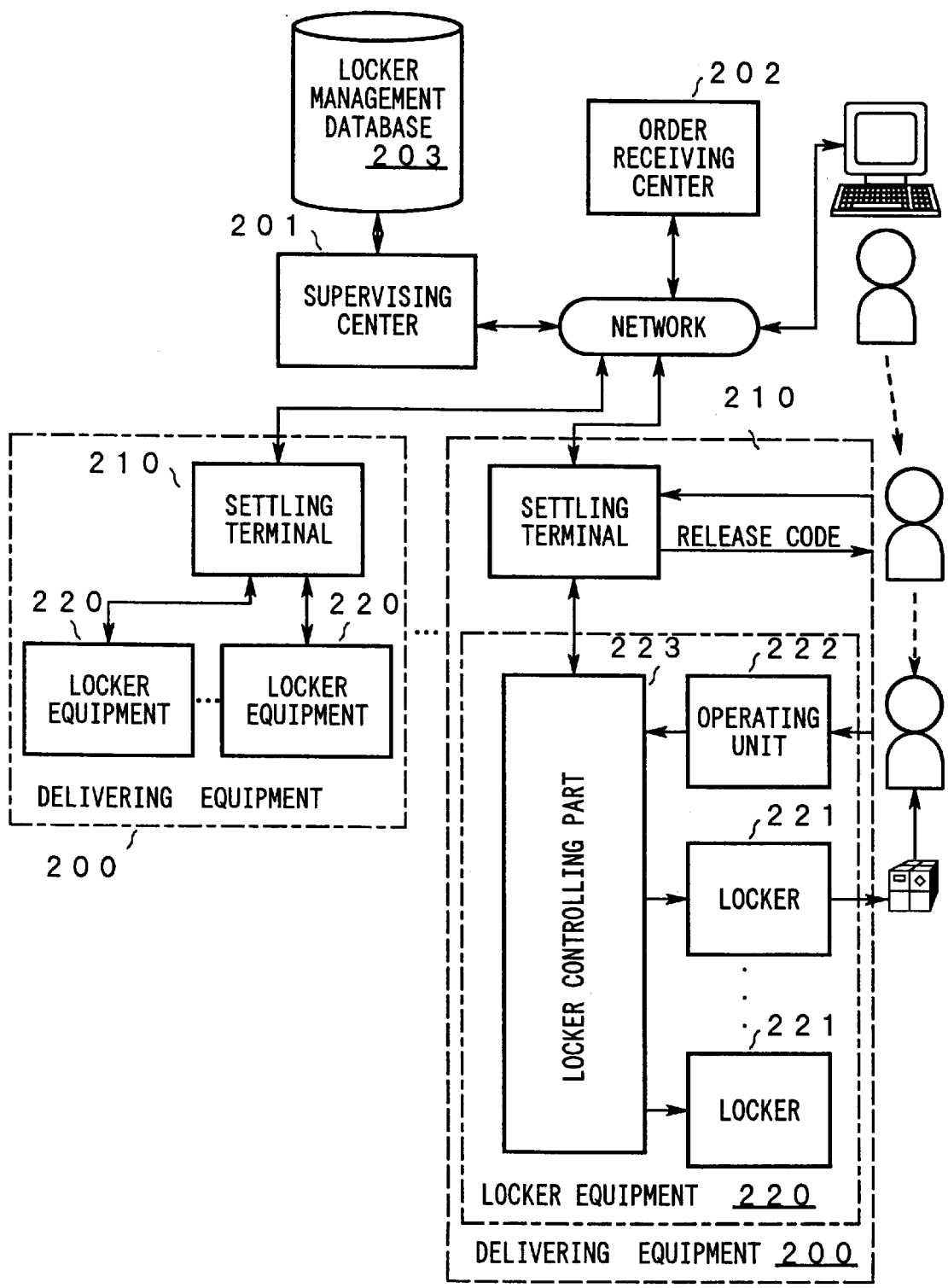
FIG. 6 shows a first embodiment of a locker type merchandise delivering system according to the present invention.

FIG. 6 shows a first embodiment of a locker type merchandise delivering system according to the present invention.

In the locker type merchandise delivering system shown in FIG. 6, a plurality of delivering equipment 200 are installed at places that are open to free access by unspecified persons such as the station yards and underpasses.

Each delivering equipment 200 includes a settling terminal 210 and at least one locker equipment 220.

The settling terminal 210 has the function of receiving the payment of the charge by an unspecified customer and the function of generating settling information that evidences completion of due settlement and issuing a release code for unlocking an appropriate locker 221 provided to the locker equipment 220 after settlement is completed.

The locker equipment 220 includes a plurality of lockers 221, an operating unit 222 and a locker controlling part 223. Confirming the settling information and the release code inputted through the operating unit 222, the locker controlling part 223 releases the lock of the corresponding locker 221 and delivers the merchandise accommodated in this locker 221 to the customer.

A supervising center 201 shown in FIG. 6 and the settling terminal 210 provided to the delivering equipment 200 are connected to each other through a network. Data can be exchanged between the supervising center 201 and each settling terminal 210. An order receiving center 202 shown in FIG. 6 and the supervising center 201, too, are connected to each other through the network. Necessary data can be exchanged between the order receiving center 202 and the supervising center 201.

Individual lockers 221 provided to each delivering equipment 200 are registered to a locker management database 203 shown in FIG. 6. Whenever the supervising center 201 collects the data about the status of each locker, for example, the data so collected is reflected on this locker management database 203.

A procedure for utilizing this locker type merchandise delivering system will be roughly explained. The customer orders merchandise to the order receiving center 202 through a personal computer, etc, connected to the network. In this instance, the customer designates the desired date and place for the delivery of the merchandise and receives in turn the ordering code for specifying the order from the order receiving center 202. The customer goes to the place he or she designated on the day he or she designated, inputs the ordering code to the settling terminal 210 provided to the delivering equipment 200 installed there, settles the payment and receives the release code issued by the settling terminal 210. When the customer inputs the release code through the operating unit 222 provided to appropriate locker equipment 220, the locker controlling part 223 releases the lock of the locker 221 corresponding to the ordering code. In consequence, the customer 221 can receive the merchandise accommodated in the locker 221.

Next, the detailed construction of each part constituting the locker type merchandise delivering system will be explained about the scene of each of ①the order of a merchandise, ②the distribution of the merchandise and ③the deliver of the merchandise.

Figure 7:
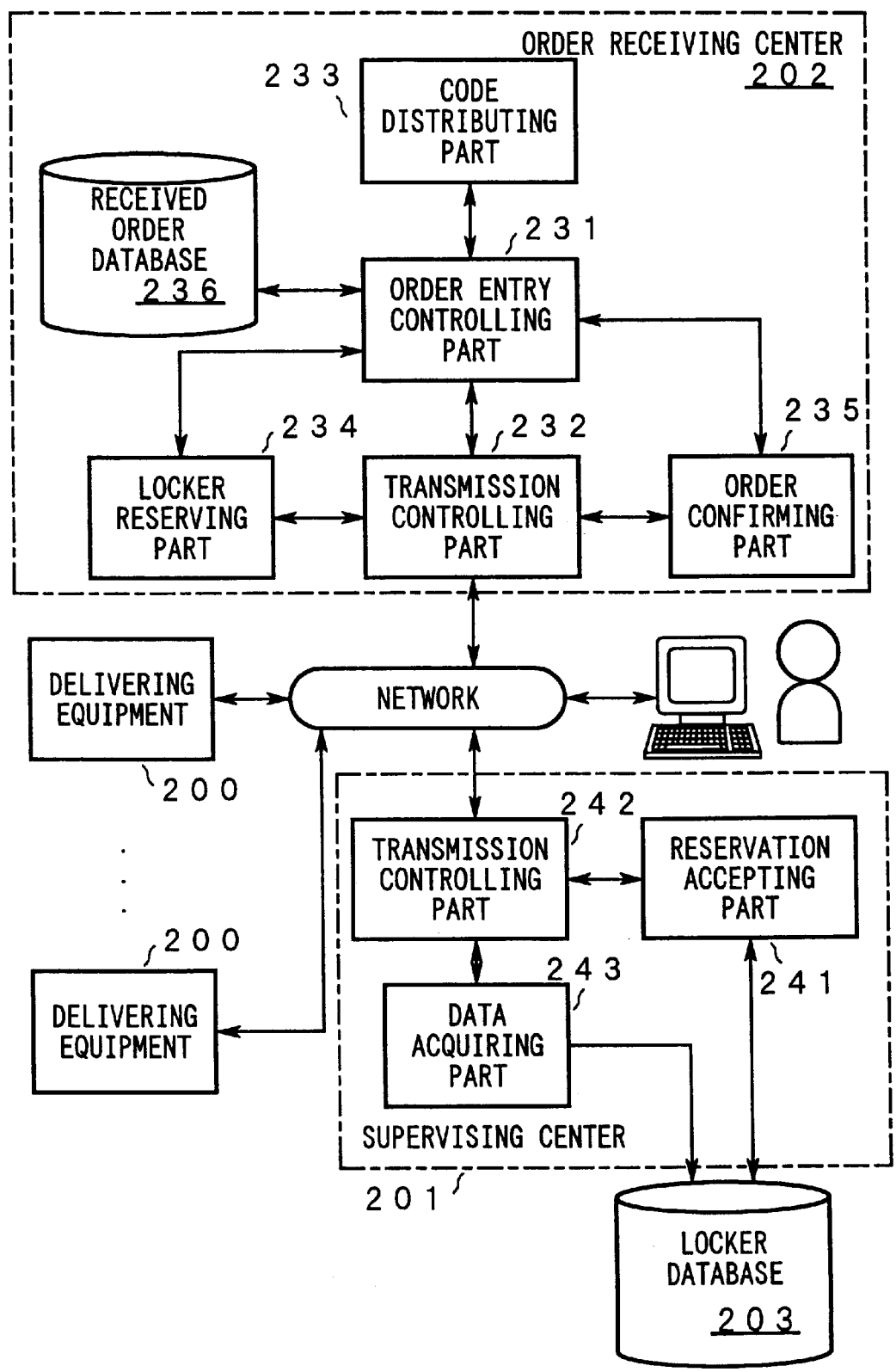
FIG. 7 shows a detailed construction of an order receiving center and a supervising center.

① Order of merchandise:

FIG. 7 shows a detailed construction of the order receiving center and the supervising center.

In the order receiving center 202 shown in FIG. 7, an order entry controlling part 231 exchanges data with the customer through a transmission controlling part 232, controls the operations of a code distributing part 233, a locker reserving part 234 and an order confirming part 235, and executes a process for accepting the order of the merchandise. The code distributing part 233 gives the ordering code for specifying the order to the order accepted by the order entry controlling part 231. The ordering information that represents the contents of the individual orders accepted by the order entry controlling part 231 is registered to the received order database 236 corresponding to the ordering code. The locker reserving part 234 shown in FIG. 7 gains access to the supervising center 201 through the transmission controlling part 232 in response to the instruction from the order entry controlling part 231, exchanges the data necessary for reserving an appropriate locker with the supervising center 201, and notifies the resulting reservation information to the order entry controlling part 231. The order entry controlling part 231 then collects identification information of the customer such as the mail address during the process for accepting the order from the customer and registers this identification information as a part of the ordering information to the received order database 236.

On the other hand, the reservation accepting part 241 provided to the supervising center 201 shown in FIG. 7 exchanges the data necessary for the reservation of the locker with the order receiving center 202 through the transmission controlling part 242, and stores the data on the reservation accepted in consequence into the database 303. The data acquiring part 243 acquires the data representing the status of each of the lockers 221 provided to each delivering equipment 200 through the transmission controlling part 242, and reflects the data on the locker database 203.

Figure 8:
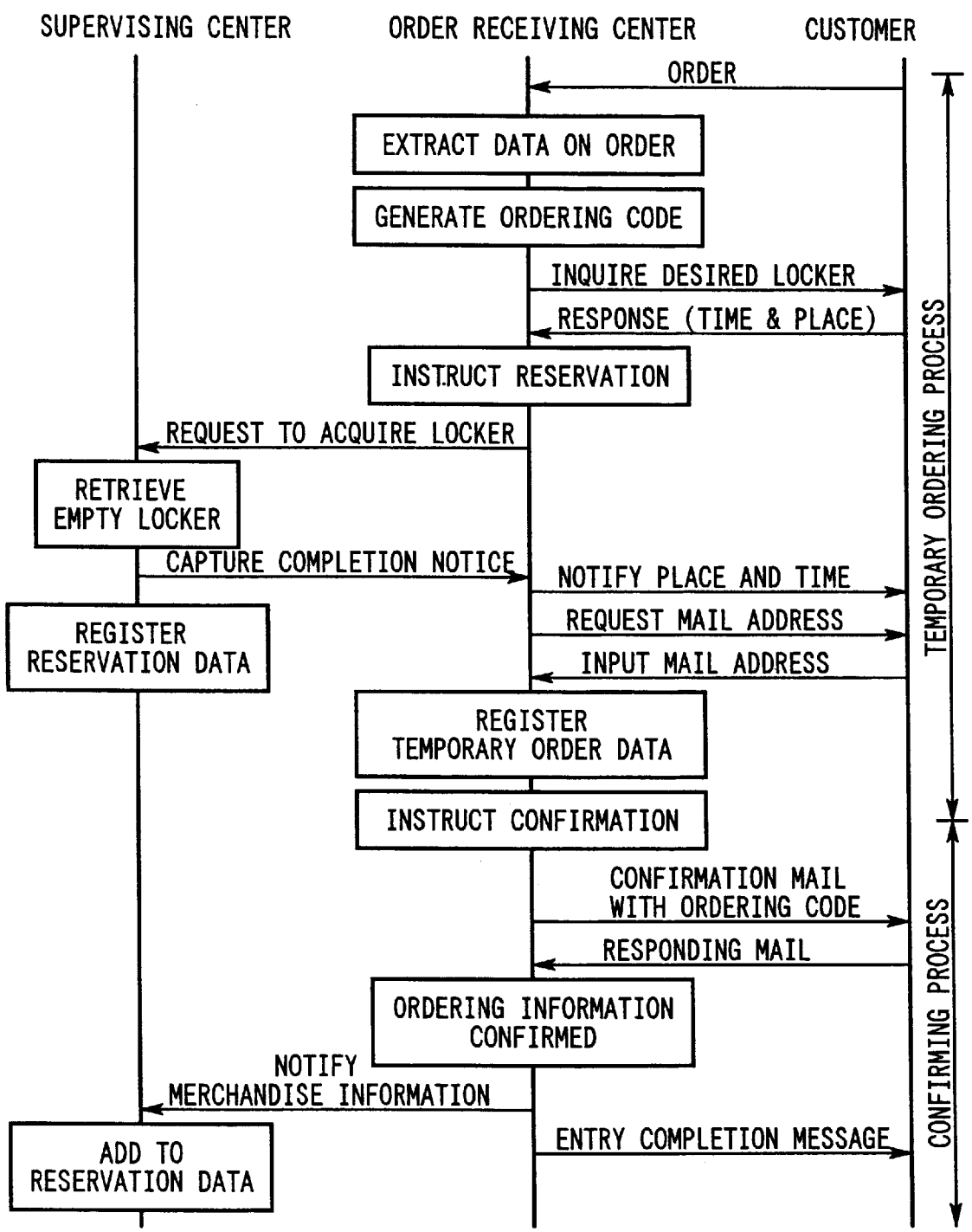
FIG. 8 is a sequence diagram for explaining an ordering procedure of merchandise.

FIG. 8 shows a sequence diagram for explaining the ordering procedure of the merchandise.

The operations of the order receiving center and the supervising center when ordering the merchandise will be explained with reference to FIGS. 7 and 8.

After a communication channel is connected between a non-store retailing site opened on the network by an order receiving center 202 and a personal computer, etc, of the customer, the customer executes a predetermined operation on the WEB page of this non-store retailing site to select the merchandise, and the merchandise is ordered through the network (see FIG. 8). The order entry controlling part 231 controls the display on the WEB page in response to the customer's operation, extracts the data on the merchandise selected by the customer on the WEB page and starts the order entry process. At this time, the order distributing part 233 issues the ordering code for specifying this order in accordance with the instruction from the order entry controlling part 231.

Next, the order entry controlling part 231 inquires the customer of the desired locker for delivery through the WEB page and extracts the time and the place the customer inputs through the WEB page as a response to this inquiry. Then the order entry controlling part 231 designates the time and the place and instructs the locker reserving part 234 to reserve the locker.

In response to this instruction, the locker reserving part 234 gains access to the supervising center 201, notifies the ordering code for specifying the order, the merchandise information representing the kind, the quantity and price of the merchandise and the time and place described above, and requests to acquire an appropriate locker.

The reservation accepting part 241 retrieves the empty locker satisfying the condition designated the request from the locker database 203. When the empty locker is retrieved, the reservation accepting part 241 sends a capture completion notice representing the success of acquisition of the locker to the order receiving center 202, and writes the ordering code it receives from the order receiving center 202, the merchandise information and data representing the reservation of the locker to the record of the locker database 203 about the corresponding locker.

In response to the capture completion notice described above, the locker reserving part 234 notifies a notice representing that the locker for delivering the merchandise is secured, to the order entry controlling part 231. The order entry controlling part 231 notifies the place of the locker so acquired and the time for delivery to the customer through the WEB page, and displays a message requesting the customer to input his or her mail address on the WEB page. When the customer inputs his or her mail address on the WEB page in response to this message, the order entry controlling part 231 extracts the mail address from the WEB page and registers the mail address with the ordering code and the data for specifying the merchandise as temporary order data to the received order database 236.

The order entry controlling part 231 completes the temporary ordering process on the WEB page at the point when the temporary order data is registered to the received order database 236.

Incidentally, when a corresponding empty locker cannot be acquired at the time and the place designated by the customer, the customer is urged to designate another time and/or place. Retrieval of the empty locker is again made on the basis of the time and the place that are designated afresh.

The order confirming part 235 generates the confirming mail to confirm the intention of the customer for each temporary order data registered to the received order database 236 in accordance with the instruction from the order entry controlling part 231, and requests the transmission controlling part 232 to transmit the confirming mail to the mail address of the customer registered to the received order database 236 in such a manner as to correspond to each ordering code.

In consequence, the transmission controlling part 232 transmits each confirming mail to the mail address of each customer through the network. The transmission controlling part 232 receives the responding mail to the confirming mail and returns it to the order confirming part 235.

For example, the order confirming part 235 generates a confirming mail inclusive of an operation button for activating the operation of returning the mail address of the customer and the ordering code to the order receiving center 202 through the electronic mail, and sends this confirming mail to the mail address of the customer through the transmission controlling part 232. In this case, the customer can respond to the confirming mail by merely clicking the operation button contained in the confirming mail. Therefore, the labor of making inputs by the customer can be eliminated. Incidentally, this confirming mail can be accomplished sufficiently by the HTML technology that has been utilized ordinarily.

When the responding mail returns in this way in response to the confirming mail addressed to the mail address registered to the received order database 236, the order confirming part 235 judges that the intention of the customer can be confirmed for the corresponding ordering code, and notifies to the order entry controlling part 231 that the order corresponding to the ordering code is confirmed.

In response to this notice, the order entry controlling part 231 registers this time the ordering information corresponding to the ordering code as the confirmed ordering information to the received order database 236. Next, the order entry controlling part 231 sends to the customer the entry completion message representing that the order receiving process is completed, through the WEB page. The order entry controlling part 231 sends the confirmed ordering information to a sales management center (not shown) of a higher order and requests to start a necessary process for arranging and delivering the merchandise. The order entry controlling part 231 utilizes at this time the function of the transmission controlling part 232 to notify the merchandise information contained in the confirmed ordering information to the supervising center 201. The reservation accepting part 241 receives this merchandise information and stores the same as a part of the reservation information corresponding to the ordering code in the locker database 203.

After the temporary ordering process is completed as described above, the order confirming part 235 and the customer exchanges the electronic mail. In this way, the intention of the customer can be confirmed separately from the operation on the WEB page, and whether or not the person gaining access to the non-store retailing site is the owner of the mail address can be confirmed. Also, an invalid order can be checked.

Incidentally, when the responding mail to the confirming mail is not returned, the order entry controlling part 231 judges that the person gaining access to the non-store retailing site is not identical to the owner of the mail address, and executes the error recovery process to cancel the temporary order data and to release the reservation of the locker.

In the procedures described above, it is only the mail address of the customer that the order receiving center 202 receives from the customer, on any characteristic information of the customer. In other words, the customer need not send the information relating to privacy such as his or her home address or telephone number, and privacy of the customer can be strongly secured.

Figure 9:
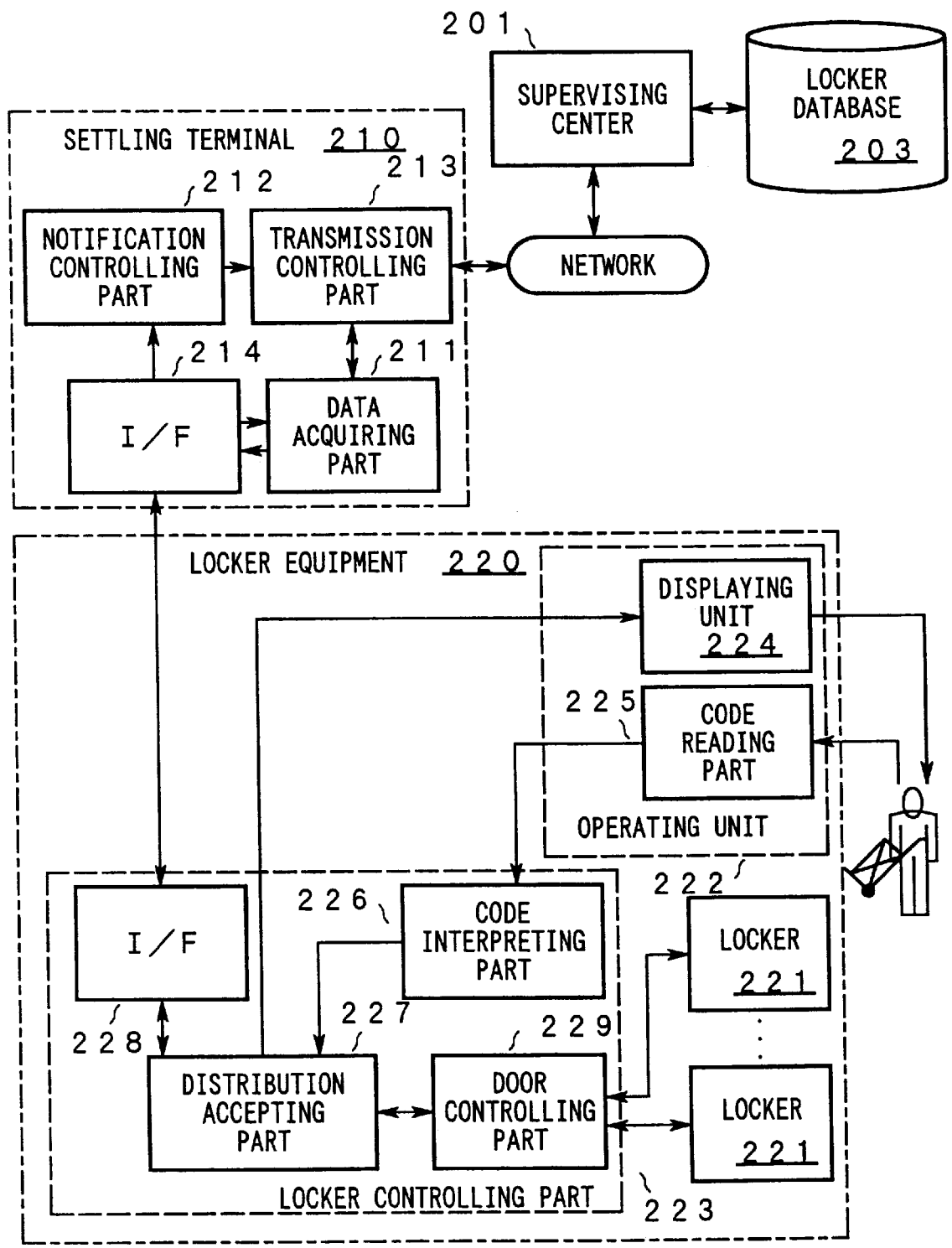
FIG. 9 shows a detailed construction of delivering equipment.

② Distribution of merchandise:

FIG. 9 shows a detailed construction of the delivering equipment.

Next, the detailed construction of the delivering equipment for distributing the merchandise and the merchandise distribution process will be explained with reference to FIGS. 9 and 10.

In the settling terminal 210 provided to the delivering equipment, the data acquiring part 211 and the notification controlling part 212 are connected to the network through the transmitting controlling part 213 as shown in FIG. 9, and can exchange the data with the supervising center 201 through the network. The data acquiring part 211 and the notification controlling part 212 are connected to the locker equipment 220 through the interface circuit (I/F) 214.

The operating unit 222 provided to the locker equipment 220 includes a displaying part 224 and a code reading part 225. The code reading part 225 has the function of reading information magnetically recorded to the recording medium, for example. The data read by this code reading part 225 is sent to a code interpreting part 226 provided to the locker controlling part 223 and the code interpreting part 226 interprets the data. The distribution accepting part 227 provided to the locker controlling part 223 is connected to the settling terminal 210 through the interface circuit (I/F) 228 and can exchange the data with the data collecting part 211 and with the notification controlling part 212 through the interface circuit 228. The distribution accepting part 227 inputs a suitable instruction to the door controlling part 229 on the basis of the interpretation result by the code interpreting part 226 and the data received through the interface circuit 228, and receives the notice relating to the condition of the door of a locker 221 from the door controlling part 229.

Next, the merchandise distribution process will be explained.

Figure 10:
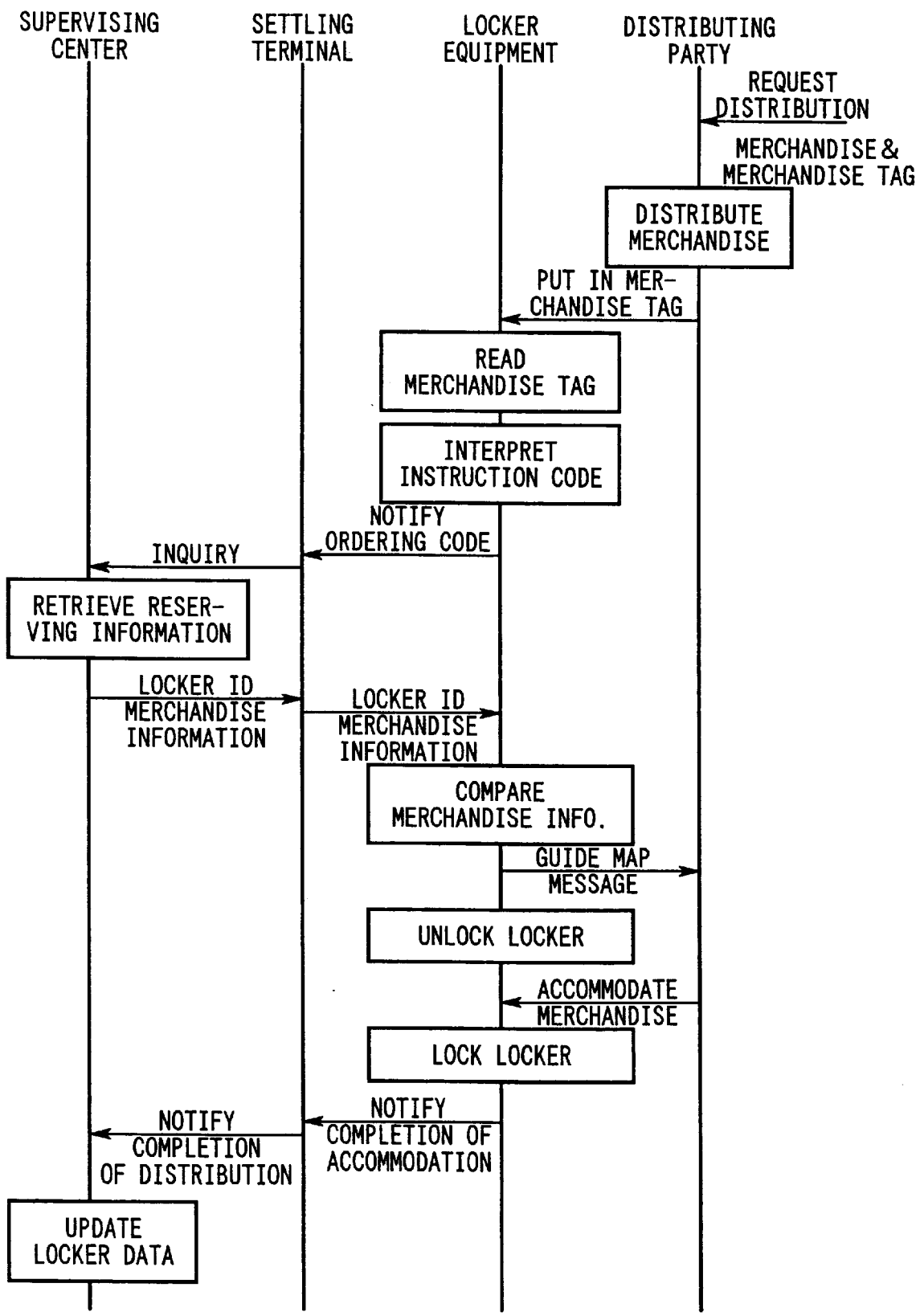
FIG. 10 is a sequence diagram for explaining a distribution sequence of merchandise.

FIG. 10 is a sequence diagram for explaining the merchandise distribution process.

The order receiving party that accepts the order from the customer prepares the merchandise till the designated time of distribution and generates a merchandise tag by recording an instruction code representing the start of the distribution process with the ordering code and the merchandise information to a recording medium that can be read by the code reading part 225 provided to the locker equipment 220, for example. The order receiving party gives this merchandise tag with the merchandise prepared to the distributing party, and requests the distributing party to distribution the merchandise by designating the installation position of the locker equipment 220.

Receiving this request, the distributing party transports the merchandise to the installation position of the designated locker equipment 220 and feeds the merchandise tag into the operating unit 222 provided to this locker equipment 220.

The code reading part 225 reads the data recorded on the merchandise tag in response to feeding of the merchandise tag. The data so read is inputted to the code interpreting part 226. The code interpreting part 226 interprets the instruction code contained in the data read and provides the interpretation result for starting the distributing process.

The distribution accepting part 227 receives the data recorded to the merchandise tag from the code interpreting part 226 in response to the interpretation result and notifies the ordering code contained in this data to the settling terminal 210.

In the settling terminal 210, the data acquiring part 211, receiving the notice of the ordering code through the interface circuit 214, gains access to the supervising center 201 by utilizing the function of the transmission controlling part 213 and inquires of the information for specifying the corresponding locker and the merchandise information for specifying the merchandise to be accommodated on the basis of the ordering code.

The supervising center 201 retrieves in response to this query the corresponding reserving information from the locker database 203 and returns the locker ID and the merchandise information contained in this reserving information to the settling terminal 210 through the network.

In the settling terminal 210, the locker ID and the merchandise information are transmitted to the data acquiring part 211 through the transmission controlling part 213 and further to the locker equipment 220 through the interface circuit 214.

In the locker equipment 220, when the locker ID and the merchandise information are transmitted to the distribution accepting part 227 through the interface circuit 228, the distribution accepting part 227 judges whether or not this locker ID indicates the locker 221 provided to the locker equipment 220. At this time, the distribution accepting part 227 compares the merchandise information notified from the supervising center 201 with the merchandise information from the code interpreting part 226. When these two merchandise information are coincident with each other, the distribution accepting part 227 generates display data for displaying a message and a guide map for guiding the distributing party to the designated locker, on the basis of the display data on a displaying unit 224 provided to the operating unit 222. The distribution accepting part 227 instructs the door controlling part 229 to unlock the corresponding locker, and the door controlling part 229 unlocks the locker 221 corresponding to the locker ID in accordance with this instruction.

The distributing party finds the designated locker by referring to the message and the guide map displayed on the displaying unit 224, puts the merchandise into the locker 221 and then closes the door to complete the distributing work.

When receiving the notice of closing of the door of the locker 221 through the door controlling part 221, the distribution accepting part 227 judges that accommodation of the merchandise is completed, and instructs the door controlling part 229 to lock the corresponding locker 221. The door controlling part 229 locks the door of the corresponding locker 221 in accordance with this instruction, and the merchandise accommodated in the locker 221 can be safely stored until it is delivered to the customer.

After confirming the locking operation of the locker 221 by the door controlling part 229, the distribution accepting part 227 notifies the settling terminal 210 that the distribution of the merchandise corresponding to the ordering code is completed, through the interface circuit 228. This notice is sent to the notification controlling part 212 through the interface circuit 214. The notification controlling part 212 further sends this notice to the supervising center 201 through the network. When the supervising center 201 updates the locker data corresponding to the ordering code in response to this notice, the completion of distribution is recorded.

When the locker ID returned from the supervising center 201 through the settling terminal 210 does not correspond to any of the lockers 221 provided to the locker equipment 220 or when the merchandise information returned from the supervising center 201 does not coincide with the merchandise information that is inputted, the distribution accepting part 227 executes a suitable error recovery process and urges the distributing party to confirm the distributing address.

In this way, each part constituting the locker controlling part 223 collects the necessary data from the supervising center 201 through the settling terminal 210 on the basis of the ordering code and the instruction code recorded to the merchandise tag, and controls the operations of the displaying unit 224 and the door controlling part 229. In consequence, merchandise is accommodated by automatically conducting the distributing party.

In addition, the merchandise information such as the kind and the quantity of the merchandise may be recorded to the merchandise tag. And the inquiry by locker controlling part 223 for the corresponding merchandise information may be made to the supervising center 201 through settling terminal 210. The kind and the quantity of the merchandise contained in the merchandise information given in return for the inquiry are compared with the merchandise information recorded to the merchandise tag to confirm whether they coincide. In this way, the mistake on distribution can be prevented and reliability of distribution management can be improved.

In the system described above in which the distributing party distributes the merchandise to the position of the designated locker equipment, the distributing party has no chance of acquiring the information of the customer (e.g. the address, the telephone number, etc) as the recipient of the merchandise. Therefore, privacy of the customer can be strongly protected.

Incidentally, when the supervising center 201 as shown in FIG. 10 further notifies the above mentioned distributing completion notice to the order receiving center 202, the order receiving center 202 can accomplish the services that utilize the information about distribution of the merchandise. The order receiving center 202 offers the service of sending the mail representing completion of the distribution of the merchandise to the customer, and because of this, convenience of the customer can be further improved.

The information corresponding to the locker 221 managed by each settling terminal 210 may be given in advance from the supervising center 201 to each settling terminal 210 and may be stored in a memory provided to the settling terminal 210 or to the locker equipment 220. This is done so that the information on the locker 221 can be utilized whenever necessary, instead of acquiring the necessary information from the supervising center 201 in accordance with the input of the ordering code, as shown in FIG. 10.

Figure 11:
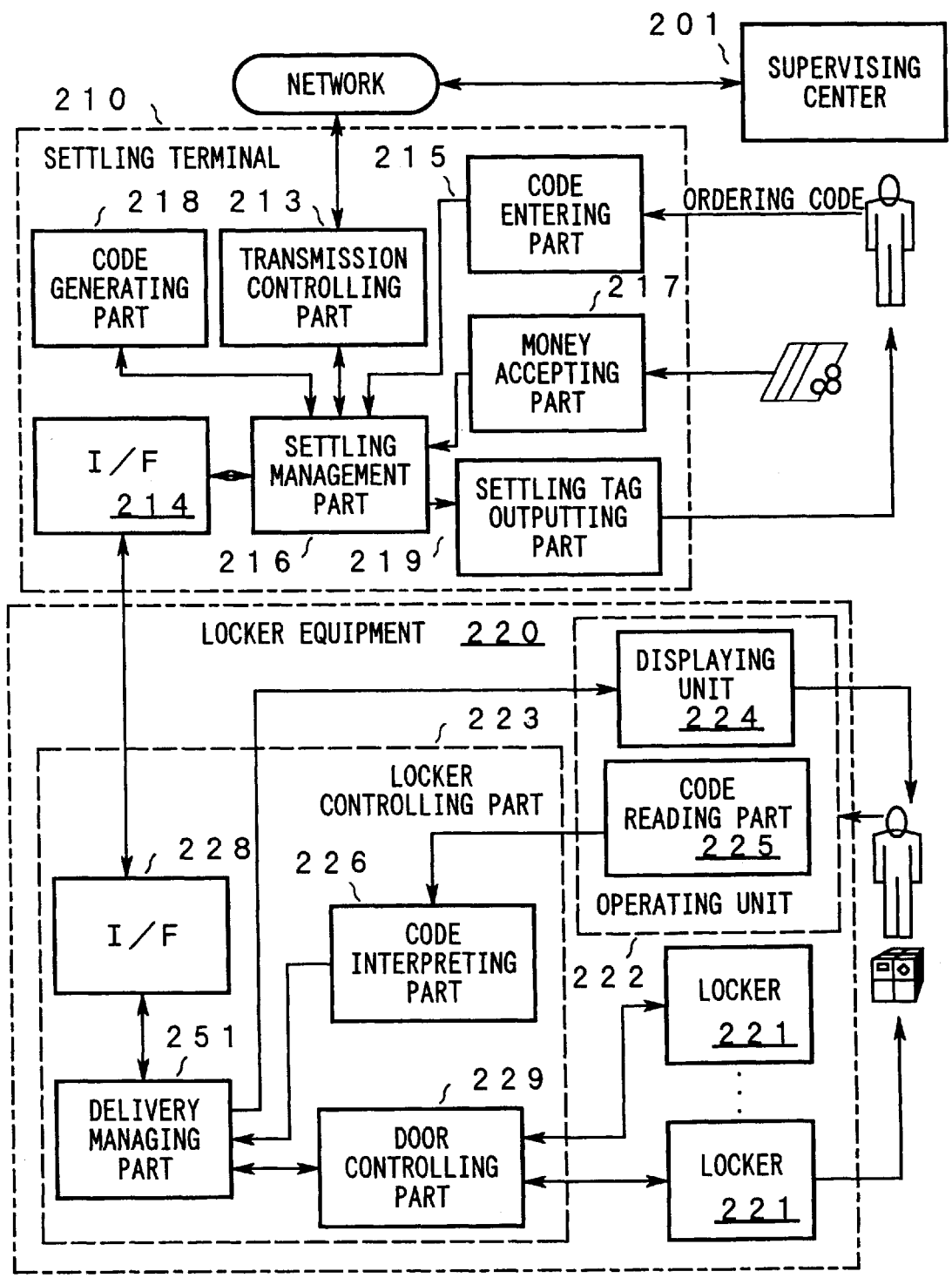
FIG. 11 shows another detailed construction of delivering equipment.
Figure 12:
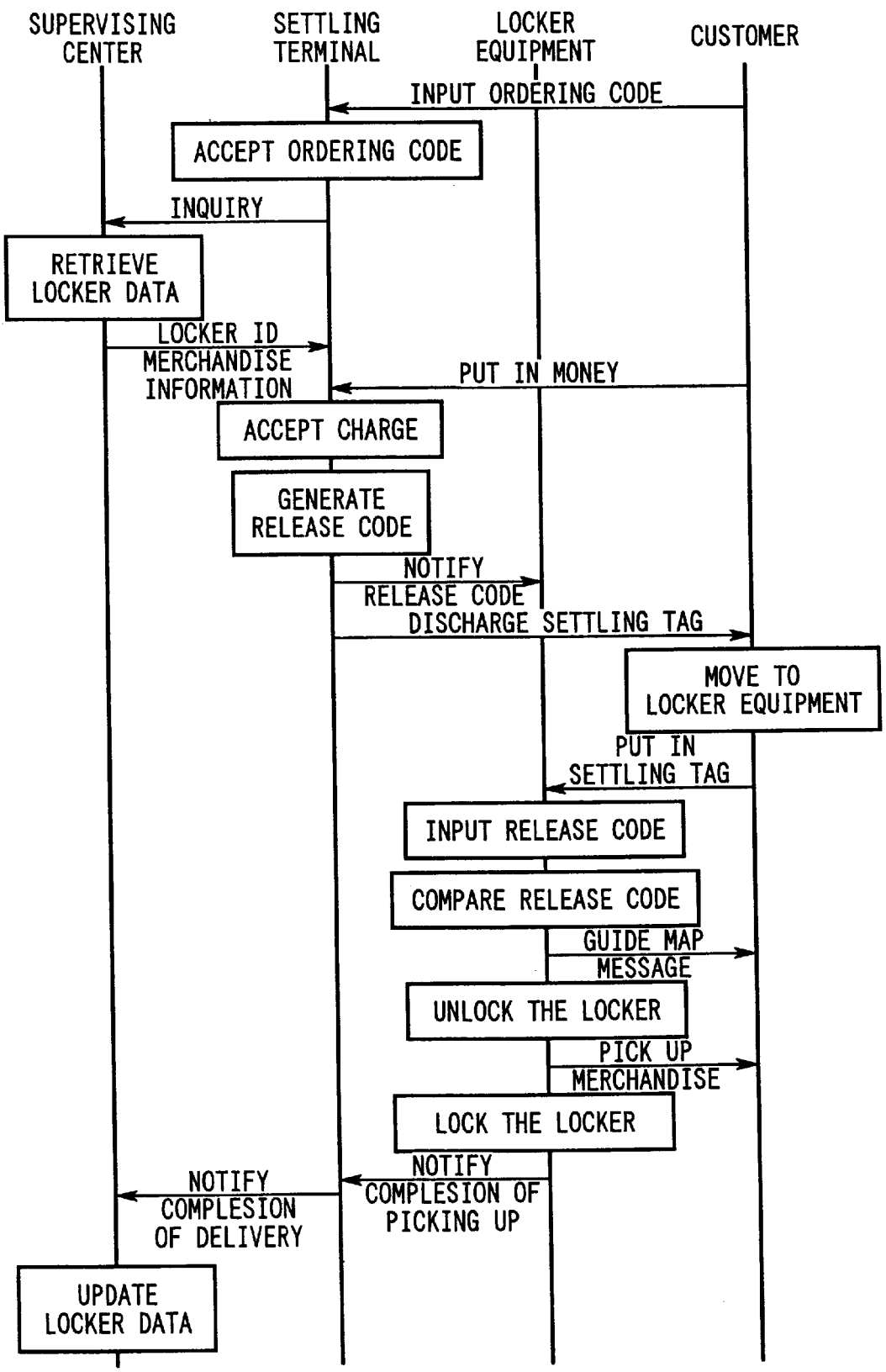
FIG. 12 is another sequence diagram for explaining a delivering procedure of merchandise.

③ Delivery of merchandise:

FIG. 11 shows a detailed construction of the delivering equipment for delivering the merchandise. FIG. 12 shows the sequence diagram useful for explaining the delivering process of the merchandise.

First, the detailed construction of the delivering equipment for delivering the merchandise will be explained with reference to FIG. 11.

In the settling terminal 210 shown in FIG. 11, the code entering part 215 includes a numeric value inputting device such as a touch panel and has a function of accepting the inputted ordering code when the customer operates this numeric value inputting device and sending it to the settling management part 216. The money accepting part 217 provided to the settling terminal 210 accepts the money the customer puts as the charge of the merchandise, and notifying the sum to the settling management part 216. The code generating part 218 generates a release code corresponding to the ordering code in a predetermined procedure in accordance with the instruction from the settling management part 216 and returns the release code to the settling management part 216. The settling tag outputting part 219 records the later-appearing settling information to a predetermined recording medium in accordance with the instruction from the settling management part 216 to form a delivering tag and discharges this delivering tag. The settling management part 216 can exchange the data with the supervising center 201 by utilizing the function of the transmission controlling part 213 through the network, and can exchange the data with the locker equipment 220 through the interface circuit 214.

In the locker equipment 220 shown in FIG. 11, the code reading part 225 provided to the operating unit 222 reads the ordering code and the release code from the recording medium. These ordering code and release code are sent to the delivery managing part 251 through the code interpreting part 226. The delivery managing part 251 compares the release code it receives for the corresponding ordering code through the interface circuit 228 with the release code that is inputted. And, the delivery managing part 251 controls the display operation of the displaying part 224 provided to the operating unit 222 in accordance with this comparison result, and controls also opening and closing of the door of the locker 221 through the door controlling part 229.

Next, the merchandise delivering process will be explained with reference to FIGS. 11 and 12.

First, the customer comes to the place where the locker equipment designated at the time of ordering is installed, operates the numeric value inputting device of the settling terminal 210 corresponding to the locker equipment 220 to input the ordering code.

The code entering part 215 notifies this ordering code to the settling management part 216 and the settling management part 216 starts the settling process. The settling management part 216 first issues the query for the locker data corresponding to this ordering code, and the transmission controlling part 213 transmits this query to the supervising center 201 through the network.

The supervising center 201 retrieves the locker data in response to this query in the same way as the merchandise distributing process, and returns the corresponding locker ID and the merchandise information inclusive of the price of the merchandise to the settling terminal 210.

The settling management part 216 uses the merchandise information so notified to judge whether or not the amount notified from the money accepting part 217 is sufficient when the customer puts in the money.

When the customer puts the appropriate amount of money as the charge, the amount notified from the money accepting part 217 coincides with the price contained in the merchandise information, and the settling management part 216 judges that the acceptance of the charge is completed. At this time, the settling management part 216 generates the instruction to generate the release code, and the code generating part 218 generates the release code corresponding to the ordering code in accordance with this instruction and returns it to the settling management part 216.

This release code is notified to the corresponding locker equipment 220 through the interface circuit 214. At this time, the settling management part 216 generates the settling information inclusive of the combination of the release code with the ordering code and the locker ID and sends it to the settling tag outputting part 219. The settling tag outputting part 219 records this settling information to a predetermined medium by unit of a system, such as a bar code or magnetic recording, that can be read by the code reading part 225. The settling tag so generated is discharged from the settling terminal 210 and is handed over to the customer.

After receiving this settling tag, the customer moves to the corresponding locker equipment 220 and feeds this settling tag into the code reading part 225 provided to the operating unit 222.

The settling information read by the code reading part 225 from this setting tag is delivered to the delivery managing part 251 through the code interpreting part 226, and the delivery managing part 251 conducts the delivering process of the merchandise on the basis of the settling information.

The delivery managing part 251 compares the combination of the ordering code and the release code read by the code reading part 225 with the combination of the ordering code and the release code that are received from the settling terminal 210 through the interface circuit 228. When they are coincident, the delivery managing part 251 generates the display data for displaying the message and the guide map for guiding the customer to the locker designated by the locker ID in the same way as the distribution of the merchandise described above, and the displaying unit 224 provided to the operating unit 222 displays the display data. At this time, the delivery managing part 251 instructs the door controlling part 229 to unlock the corresponding locker, and the door controlling part 229 unlocks the corresponding locker 221 in accordance with this instruction.

Thereafter, the customer finds the designated locker 221 with reference to the message and the guide map displayed on the displaying unit 224 and takes out the merchandise from inside the locker 221. Then, when the door is closed, the delivery of the merchandise is completed.

Receiving the notice that the door of the corresponding locker 221 is locked from the door controlling part 229, the delivery managing part 251 generates the delivering completion notice showing that the delivery of the merchandise corresponding to the ordering code is completed. This delivering completion notice is sent to the settling terminal 210 through the interface circuit 228 and further from the settling terminal 210 to the supervising center 201. The supervising center 201 represents that the corresponding locker 221 became empty by updating the corresponding locker data recorded to the locker database 203 in response to this notice in the same way as the distribution of the merchandise described above.

As described above, the settling tag is issued in accordance with completion of settlement of the charge in the settling terminal 210, and each part of the locker controlling part 223 controls the operation of the displaying unit 224 and the door controlling part 229 on the basis of the settling information recorded to the settling tag. In this way, the operation of delivering the merchandise to the customer who settles the charge can be managed fully automatically. Since all manual operations can be excluded from the process of delivering merchandise, privacy of the customer can be given further protection.

As the release code is generated in accordance with completion of the settlement of the charge, illegal acquisition of the merchandise due to the leak of the release code can be prevented reliably and the merchandise can be delivered reliably to the customer who completes the settlement. Therefore, reliability of the management of delivery by the procedure described above can be improved.

Incidentally, when the completion notice shown in FIG. 12 notified from the settling terminal 201 to the supervising center 201 is further notified to the order receiving center 202 through the supervising center 201, the order receiving center 202 can accomplish services that utilize the information on the delivery of the merchandise. For example, when an incentive service is given to excellent customers who responsively complete the delivery of the merchandise within the term, excellent customers can be reserved.

The information corresponding to the lockers 221 managed by each settling terminal 210 may be given in advance from the supervising center 201 to each settling terminal 210 and may be stored in the memory provided to the settling terminal 210 or to the locker equipment 220, instead of acquiring the necessary information by sending the query to the supervising center 201 in response to the input of the ordering code. This is so that it can be utilized, whenever necessary.

It is also possible to keep the release code effective for only a limited amount of time after the settlement of the charge by the settling terminal 210 is completed.

In this case, the settling management part 216 provided to the settling terminal 210 notifies the time, at which the release code is generated, together with the combination of the release code and the ordering code to the locker equipment 220, and the delivery managing part 251 holds such an information. The delivery managing part 251 compares the present time and the time the release code corresponding to each ordering code was generated in a predetermined time interval, cancels the release code having a time difference exceeding the limited time, and notifies this notice of canceling the release code to the supervising center 201 through the settling terminal 210.

When the effective term of the release code is thus limited, necessary measures such as recovery of the merchandise or re-distribution can be taken when the customer does not pick up the merchandise even after settlement of the charge is completed. Consequently, the corresponding locker can be prevented from being unnecessarily occupied and effective utilization of the locker can be accomplished.

Next, the explanation will be given on the method of accomplishing the settling terminal by utilizing the function of the automatic ticket-vending machine installed in the station yard.

Figure 13:
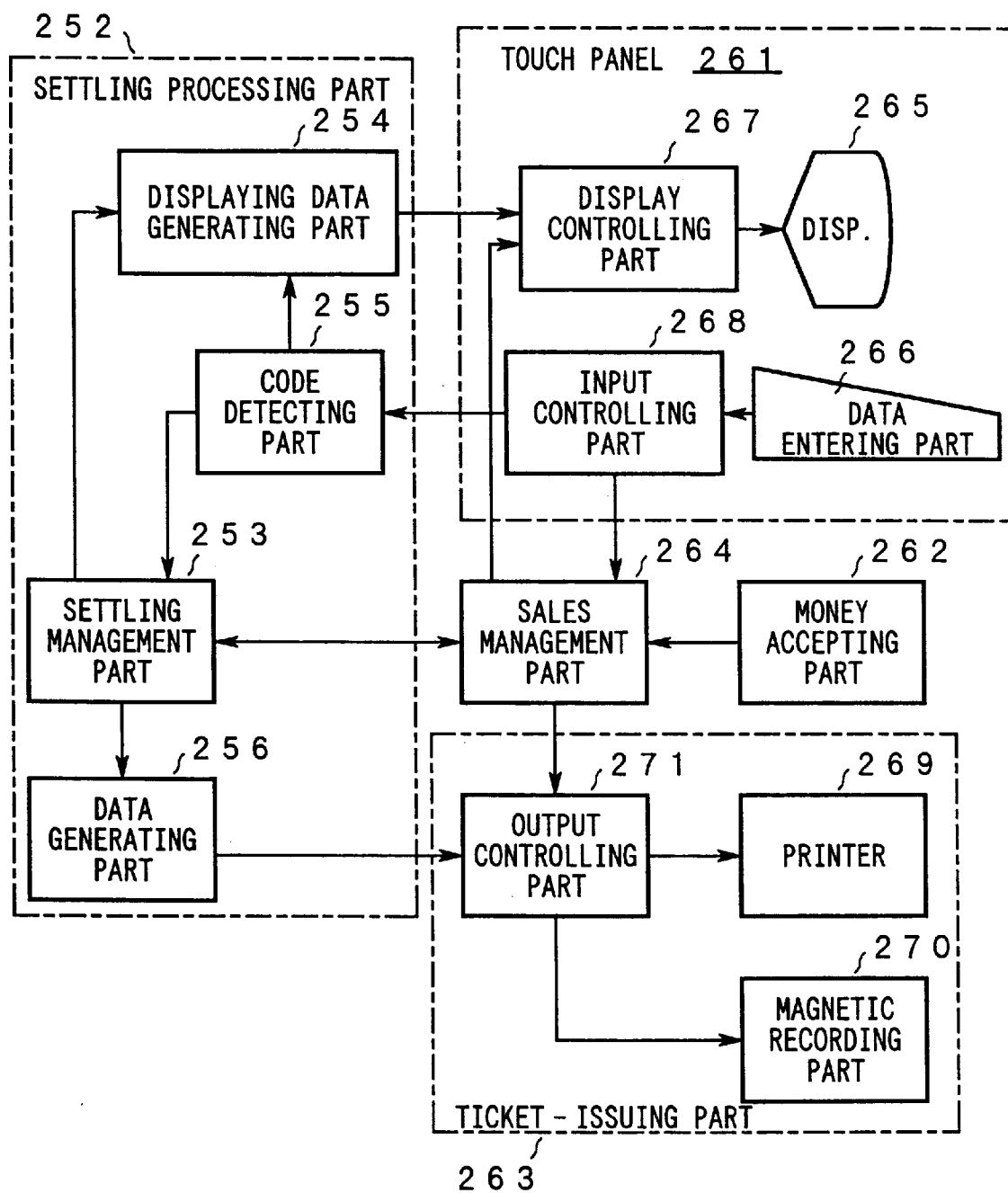
FIG. 13 shows a construction of automatic ticket-vending machine having a built-in function of a settling terminal.

FIG. 13 shows the construction of the automatic ticket-vending machine having the built-in function of the settling terminal.

The automatic ticket-vending machine shown in FIG. 13 includes a settling processing part 252 in addition to a touch panel 261 for accepting the data input by the customer, a money accepting part 262 for accepting the money put in by the customer, a ticket-issuing part 263 for issuing a ticket and a sales management part 264 for managing operation of touch panel 261, money accepting part 262, and ticket-issuing part 263.

The touch panel 261 shown in FIG. 13 includes a displaying unit 265 and a data entering part 266. A display controlling part 267 controls the displaying operation by the displaying unit 265. The data inputted by the data entering part 266 is used for the process by a sales management part 264 through an input controlling part 268.

The ticket-issuing part 263 shown in FIG. 13 includes a printer 269 for printing characters and symbols to a predetermined sheet, a magnetic recording part 270 for magnetically recording information on a magnetic layer coated onto the predetermined sheet, and an output controlling part 271 for controlling their operations.

This automatic ticket-vending machine ordinarily sells tickets to customers on payment of money under control of the sales management part 264.

On the other hand, the settling processing part 252 shown in FIG. 13 includes a displaying data generating part 254, a code detecting part 255 and a data generating part 256 in addition to a settling management part 253 corresponding to the settling management part 216 shown in FIG. 11.

The code detecting part 255 shown in FIG. 13 receives the data inputted by the data entering part 266 provided to the touch panel 261 described above, and notifies that it has detected a predetermined code, to the display data generating part 254. In response to this notice, the display data generating part 254 generates the display data for displaying a numeric keypad for inputting the ordering code on the displaying unit 265 and sends it to the display controlling part 267 as the display data that replaces the display data for ordinary ticket sales. When the numeric keypad is displayed on the displaying unit 265, the code detecting part 255 analyzes the data inputted from the data entering part 266, judges the numeric keys operated by the customer and notifies the ordering code comprising a series of figures represented by the numeric keys to the settling management part 253.

As the code detecting part 255 and the displaying data generating part 254 operate in response to the predetermined operation, the numeric keypad for inputting the ordering code can be displayed on the displaying unit 265 of the touch panel 261 provided to the automatic ticket-vending machine, and the ordering code inputted by the customer by operating the numeric keypad can be detected. In other words, the touch panel 261 can play the function analogous to the function of the numeric value inputting device provided to the code entering part 215 shown in FIG. 11.

The settling management part 253 shown in FIG. 13 has the function of exchanging the data with the sales management part 264.

For example, after receiving the ordering code in the manner described above, the settling management part 253 receives the information about the amount of the money accommodated in the money accepting part 262 from the sales management part 264 and conducts the process necessary for receiving the corresponding money as the charge of the merchandise. In this way, the sales management part 264 and the money accepting part 217 provided to the automatic ticket-vending machine can perform the same function as that of the money accepting part 217 shown in FIG. 11.

The data generating part 256 shown in FIG. 13 receives the settling information generated by the settling management part 253, generates the printing output data for printing this settling information by the printer 269 and the magnetic outputting data for recording magnetically the settling information by the magnetic recording part 270, and sends them to the output controlling part 271.

The output controlling part 271 controls the printing operation by the printer 269 and the magnetic recording operation by the magnetic recording part 270 on the basis of these printing output data and magnetic output data, generates a settling tag in place of the ticket, and discharges the settling tag. In other words, the ticket-issuing part 263 can play the function equivalent to that of the settling tag outputting part 219 showing in FIG. 11.

Here, the station yard is the place where a large number of locker equipment can be installed and a large number of unspecified persons gather and scatter with hardly any time limitation. Therefore, it is particularly suitable as the place where the delivering equipment according to the invention is installed.

When the function of the settling terminal is materialized by utilizing the automatic ticket-vending machine as described above, settling of the charge of the merchandise can be conducted by utilizing a large number of the automatic ticket-vending machine installed in the station instead of installing afresh the settling terminals, convenience of the customer can be improved and the cost required for commencing the service by the locker type merchandise delivering system can be drastically reduced. In consequence, locker type merchandise delivering system will be widely used.

As described above, the construction in which the settling terminal issues the settling tag and the locker equipment reads this settling tag and which inputs the release code is suitable for managing the settlement of the merchandises accommodated in a large number of locker equipment 220 by one settling terminal 210.

In contrast, the delivering equipment that integrates the settling terminal 210 corresponding to the locker equipment 220 can be constituted, too.

Figure 14:
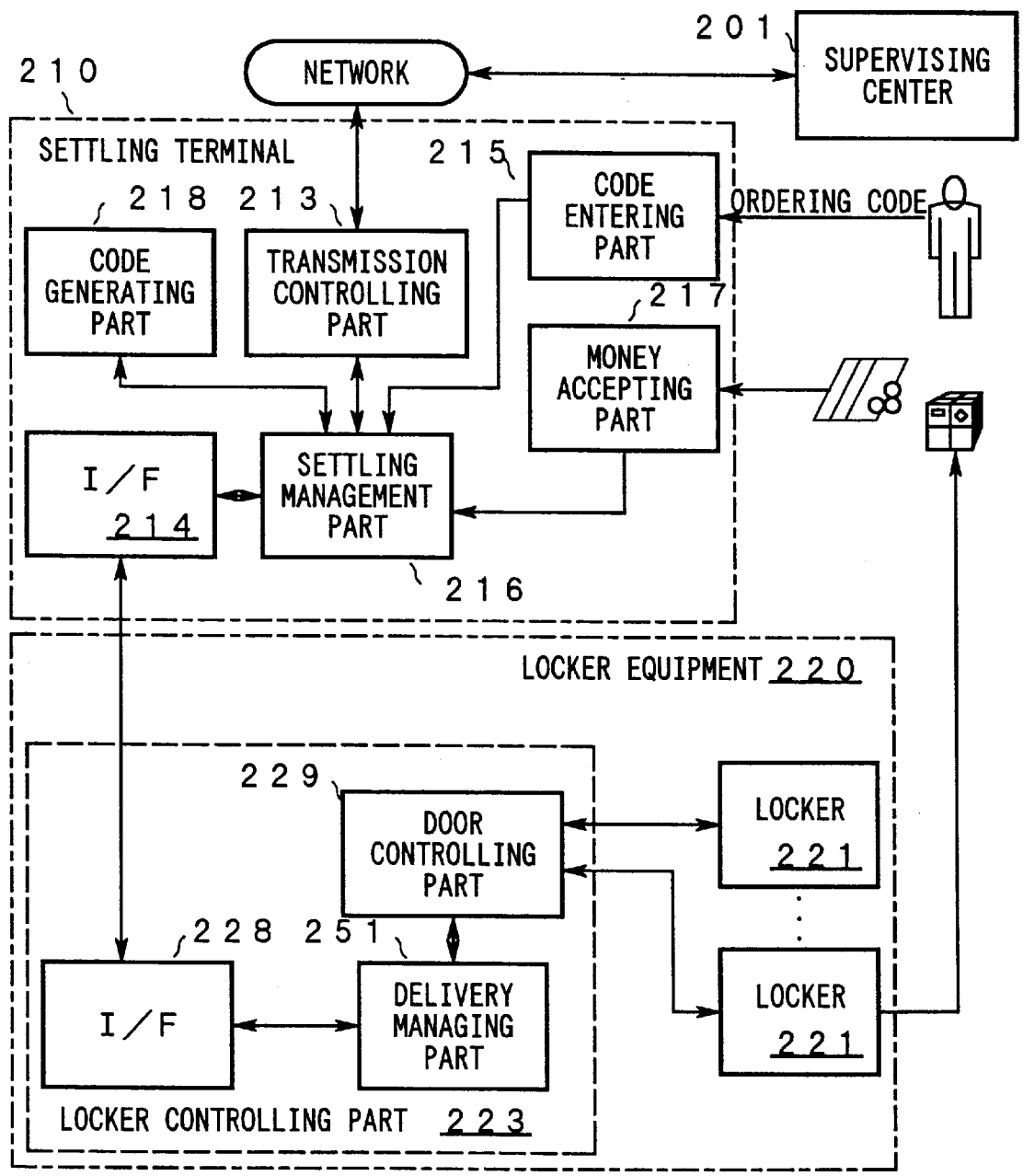
FIG. 14 shows delivering equipment according to another embodiment.

FIG. 14 shows the delivering equipment according to another embodiment.

In FIG. 14, a settling terminal 210 includes a transmission controlling part 213, an interface circuit 214, a code entering part 215, a settling management part 216 and a money accepting part 217. A locker controlling part 223 of locker equipment 220 includes an interface circuit 228 and a door controlling part 229.

When the locker equipment 220 and the settling terminal 210 are integrated to constitute the delivering equipment, the customer can settle the charge of the merchandise at a position extremely close to the locker that accommodates the merchandise.

In this case, the settling management part 216 generates the notice representing that the settlement for the corresponding locker is completed, whenever the settlement is completed. Receiving this notice, the delivery managing part 251 instructs the door controlling part 229 to unlock the door of the corresponding locker.

In the delivering equipment shown in FIG. 14, the operating unit 222 need not be provided to the locker equipment 220. Therefore, the delivering equipment can be made compact as a whole. Such delivering equipment can be installed in a limited space such as the storefront of a convenience store, for example.

The invention is not limited to the above embodiments and various modifications may be made without departing from the spirit and the scope of the invention. Any improvement may be made in part or all of the components.

What is claimed is:

1. A locker type merchandise delivering system including a plurality of merchandise delivering equipment each being constituted by integrating together a plurality of lockers capable of being locked, settling means for settling charge of a merchandise, and door controlling means for controlling opening and closing of a door provided to each of said lockers, said plurality of merchandise delivering equipment installed at places where unspecified persons can freely enter and leave, comprising:

order receiving means for receiving designation of time and place at which a customer desires to receive the merchandise, when ordering the merchandise;

order entry controlling means for generating an ordering code for specifying the order of the merchandise, and for managing data relating to said designated time and place and ordering information inclusive of the price of said merchandise in such a fashion as to associate them with said ordering code; and sending means for sending said ordering code generated by said order entry controlling means to said customer, wherein said settling means includes:

ordering code inputting means for accepting the input of said ordering code;

ordering information inputting means for receiving, from said order entry controlling means, ordering information corresponding to said ordering code inputted by said ordering code inputting means, before the settlement of charge of said merchandise;

accepting means for accepting the charge of said corresponding merchandise on the basis of said ordering information; and code notifying means for notifying to said door controlling means a release code for unlocking the door of said locker accommodating said merchandise in response to the acceptance of said charge, and wherein said door controlling means includes:

code receiving means for generating a release instruction to unlock said locker accommodating said merchandise in response to the reception of said release code; and release means for releasing the lock built into the door of said locker accmmodating said merchandise in accordance with said release instruction.

2. A locker type merchandise delivering system according to claim 1, wherein said sending means comprises:

uplinking means for notifying said ordering code to the destination represented by identification information for specifying a customer ordering the merchandise; and acquiring mean for acquiring a response to said notification and notifying the response to said order controlling means.

3. A locker type merchandise delivering system according to claim 1, wherein said door controlling means comprises:

merchandise information storing means for storing merchandise information for specifying a merchandise to be accommodated in said locker and said ordering code corresponding to said merchandise, to correspond to each said locker;

merchandise information inputting means for receiving, prior to the accommodation of the merchandise into said locker, said ordering code relating to said merchandise and the corresponding merchandise information; and retrieving means retrieving ordering code and merchandise information coincident with said ordering code and said merchandise information inputted, from said merchandise information storing means, and for inputting a release instruction instructing said release means to release the lock of said locker shown in the retrieving result.

4. A locker type merchandise delivering system according to claim 1, wherein said door controlling means comprises:

code acquiring means for acquiring said ordering code corresponding to said merchandise when accommodating the merchandise in said locker;

distribution detecting means for detecting completion of distribution of said merchandise into said locker when said merchandise is accommodated into said locker and the door of said locker is closed; and distribution notifying means for said order entry controlling means of completing distribution of said merchandise by sending a message representing completion of distribution of said merchandise corresponding to said ordering code, when said distribution detecting means detects said completion.

5. A locker type merchandise delivering system according to claim 1, wherein said door controlling means comprises:

delivery detecting means for detecting completion of delivery of said merchandise when said merchandise in said locker with the open is taken out, and the door of said locker is closed; and delivery notifying means for sending a message representing completion of delivery of said merchandise corresponding to said ordering code to said order entry controlling means when said delivery detecting means detects completion of delivery of said merchandise.

6. A locker type merchandise delivering system including a plurality of merchandise delivering equipment each being constituted by arranging adjacent to one another a plurality of lockers capable of being locked, settling means for settling charge of a merchandise, and door controlling means for controlling opening and closing of a door provided to each of said lockers, said plurality of merchandise delivering equipment installed at places where unspecified persons can freely enter and leave, comprising:

order receiving means for receiving designation of time and place at which a customer desires to receive the merchandise, when ordering the merchandise;

order entry controlling means for generating an ordering code for specifying the order of the merchandise, and for managing data relating to said designated time and place and ordering information inclusive of the price of said merchandise in such a fashion as to associate them with said ordering code; and sending means for sending said ordering code generated by said order entry controlling means to said customer, wherein said settling means includes:

ordering code inputting means for accepting the entry of said ordering code;

ordering information inputting means for receiving, from said order entry controlling means, ordering information corresponding to said ordering code inputted by said ordering code inputting means, before the settlement of charge of said merchandise;

accepting means for accepting the charge of said corresponding merchandise on the basis of said ordering information;

code outputting means for outputting a recording medium recording settling information inclusive of the combination of a release code for unlocking the door of said locker accommodating said merchandise with said ordering code in response to the acceptance of said charge; and code notifying means for notifying the release code corresponding to said ordering code to said door controlling means, and wherein said door controlling means includes:

reading means for reading said settling information recorded in said recording medium;

code receiving means for receiving the release code notified by said settling means corresponding to said ordering code;

comparing means for comparing the release code received by said code receiving means, corresponding to said ordering code contained in said settling information, with the release code contained in said settling information, and instructing the unlocking of said locker accommodating said merchandise when they coincide with each other; and release means for releasing the lock built into the door of said locker accommodating said merchandise in accordance with said release instruction.

7. A locker type merchandise delivering system according to claim 6, wherein said sending means comprises:

uplinking means for notifying said ordering code to the destination represented by identification information for specifying a customer ordering the merchandise; and acquiring means for acquiring a response to said notification and notifying the response to said order entry means.

8. A locker type merchandise delivering system according to claim 6, wherein said door controlling means comprises:

merchandise information storing means for storing merchandise information for specifying a merchandise to be accommodated in said locker and said ordering code corresponding to said merchandise, to correspond to each said locker;

merchandise information inputting means for receiving, prior to the accommodation of the merchandise into said locker, said ordering code relating to said merchandise and the corresponding merchandise information; and retrieving means for retrieving ordering code and merchandise information coincident with said ordering code and said merchandise information inputted, from said merchandise information storing means, and for inputting a release instruction instructing said release means to release the lock of said locker shown in the retrieving result.

9. A locker type merchandise delivering system according to claim 6, wherein said door controlling means comprises:

code acquiring means for acquiring said ordering code corresponding to said merchandise when accommodating the merchandise in said locker;

distribution detecting means for detecting completion of distribution of said merchandise into said locker when said merchandise is accommodated into said locker and the door of said locker is closed; and distribution notifying means for notifying said order entry controlling means of completing distribution of said merchandise by sending a message representing completion of distribution of said merchandise corresponding to said ordering code, when said distribution detecting means detects said completion.

10. A locker type merchandise delivering system according to claim 6, wherein said door controlling means comprises:

delivery detecting means for detecting completion of delivery of said merchandise when said merchandise in said locker with the door open is taken out, and the door of said locker is closed; and delivery notifying means for sending a message representing completion of delivery of said merchandise corresponding to said ordering code to said order entry controlling means when said delivery detecting means detects completion of delivery of said merchandise.

11. A locker type merchandise delivering system according to claim 6, wherein said code outputting means comprises:

code generating means for generating a release code in response to completion of acceptance of the charge by said accepting means and putting said release code under a notifying process by said code notifying means; and recording means for recording on a predetermined recording medium said release code generated by said code generating means.

12. A locker type merchandise delivering system according to claim 6, wherein said ordering code inputting means comprises:

data inputting means provided to an automatic ticket vending machine, for inputting data necessary for purchasing a ticket, along with inputting a predetermined instruction code and an ordering code; and data entering means for receiving said predetermined instruction code and said ordering code inputted by said data inputting means, wherein said accepting means includes:

money accepting means provided to said automatic ticket vending machine, for accepting and recovering cash put in by the customer; and money receiving means for receiving the money received by said money accepting means as charge for merchandise corresponding to said ordering code, in response to acceptance of said ordering code by said data entering means, and wherein said code outputting means includes:

ticket-issuing means provided to said automatic ticket vending machine, for recording the inputted information on a recording medium as a material of a ticket and then discharging said recording medium; and record controlling means for inputting, to said ticket-issuing means, settling information inclusive of a suitable release code as information to be recorded to said recording medium, in response to receipt of the charge by said money receiving means.

* * * * *

UNITED STATES PATENT AND TRADEMARK OFFICE
CERTIFICATE OF CORRECTION

PATENT NO.    : 6,456,900 B1
DATED         : September 24, 2002
INVENTOR(S)   : Kazumasa Kakuta It is certified that error appears in the above-identified patent and that said Letters Patent is hereby corrected as shown below:

<u>Title page,</u>
Item [56], References Cited, OTHER PUBLICATIONS, insert -- Patent Abstract of Japan of JP 2-187859 dated July 24, 1990. --

<u>Column 24,</u>
Line 1, after "means" insert -- for --

Signed and Sealed this

Eighth Day of April, 2003

JAMES E. ROGAN
*Director of the United States Patent and Trademark Office*